(12) United States Patent
Osipov

(10) Patent No.: US 10,244,129 B2
(45) Date of Patent: Mar. 26, 2019

(54) METHOD OF PROCESSING AND STORING IMAGES

(71) Applicant: YANDEX EUROPE AG, Lucerne (CH)

(72) Inventor: Alexander Alexandrovich Osipov, Moscow (RU)

(73) Assignee: Yandex Europe AG, Lucerne (CH)

( * ) Notice: Subject to any disclaimer, the term of this patent is extended or adjusted under 35 U.S.C. 154(b) by 213 days.

(21) Appl. No.: 15/276,929

(22) Filed: Sep. 27, 2016

(65) Prior Publication Data

US 2017/0103286 A1 Apr. 13, 2017

(30) Foreign Application Priority Data

Oct. 12, 2015 (RU) ................................ 2015143269

(51) Int. Cl.
*G06K 9/46* (2006.01)
*G06K 9/66* (2006.01)
*H04N 1/00* (2006.01)
*H04N 5/765* (2006.01)
*G06T 7/00* (2017.01)
*G06T 7/174* (2017.01)
(Continued)

(52) U.S. Cl.
CPC ..... *H04N 1/00244* (2013.01); *G06K 9/00677* (2013.01); *G06K 9/6203* (2013.01); *G06K 9/6255* (2013.01); *G06T 7/174* (2017.01); *G06T 7/97* (2017.01); *H04N 5/765* (2013.01)

(58) Field of Classification Search
None
See application file for complete search history.

(56) References Cited

U.S. PATENT DOCUMENTS

| 6,009,204 | A  | 12/1999 | Ahmad |
| 7,228,006 | B2 | 6/2007 | Stubler et al. |
| 7,860,308 | B2 | 12/2010 | Shah |

(Continued)

FOREIGN PATENT DOCUMENTS

| EP | 0990997 A1 | 4/2000 |
| RU | 2358410 C2 | 6/2009 |

(Continued)

OTHER PUBLICATIONS

Russian search report from RU patent application No. 2015143269 dated Nov. 22, 2016.

*Primary Examiner* — Kevin Ky
(74) *Attorney, Agent, or Firm* — BCF LLP

(57) ABSTRACT

The methods and systems described herein relate to a method of processing and storing images. The method is executed by a server and comprises: acquiring, by the server, a first image and a second image; determining, by the server, a first mapping information between the first image and the second image; generating, by the server, a reference image based on the first image and the second image, the reference image comprising a set of synthetic pixels; computing, by the server, a first parameter and a second parameter, the first parameter being at least partially indicative of a visual dissimilarity between the first pixels of the first image and the respective synthetic pixels and the second parameter being at least partially indicative of the visual dissimilarity between the second pixels of the second image and the respective synthetic pixels.

19 Claims, 15 Drawing Sheets

(51) Int. Cl.
*G06K 9/00* (2006.01)
*G06K 9/62* (2006.01)

(56) References Cited

U.S. PATENT DOCUMENTS

| | | | |
|---|---|---|---|
| 7,941,619 B1 | 5/2011 | Rossi | |
| 8,213,723 B2 | 7/2012 | Sawant et al. | |
| 8,238,663 B2 | 8/2012 | Kato | |
| 8,761,496 B2 | 6/2014 | Kokumai | |
| 8,774,561 B2 | 7/2014 | Martin et al. | |
| 8,792,728 B2 | 7/2014 | Tang et al. | |
| 8,849,047 B2 | 9/2014 | Chao | |
| 8,908,911 B2 | 12/2014 | Sweet et al. | |
| 2003/0095119 A1 | 5/2003 | Jeong et al. | |
| 2005/0027649 A1 | 2/2005 | Cech | |
| 2009/0030316 A1 | 1/2009 | Chomas et al. | |
| 2010/0011917 A1 | 1/2010 | Wu | |
| 2010/0012814 A1 | 1/2010 | Boebel | |
| 2011/0216935 A1* | 9/2011 | Mays | G01C 21/3446 382/100 |
| 2012/0328210 A1 | 12/2012 | Fattal et al. | |
| 2013/0016388 A1 | 1/2013 | Amano | |
| 2014/0027053 A1 | 1/2014 | Uetani et al. | |
| 2014/0030165 A1 | 1/2014 | Malmstadt et al. | |
| 2014/0198977 A1* | 7/2014 | Narasimha | G06T 5/007 382/154 |
| 2015/0078673 A1 | 3/2015 | Xia | |
| 2016/0300337 A1* | 10/2016 | Hsieh | G06T 5/50 |

FOREIGN PATENT DOCUMENTS

| | | |
|---|---|---|
| RU | 2367019 C2 | 9/2009 |
| RU | 2367108 C2 | 9/2009 |
| RU | 2380853 C2 | 1/2010 |
| RU | 2414088 C1 | 3/2011 |
| RU | 2524869 C1 | 8/2014 |
| RU | 2528140 C1 | 9/2014 |
| RU | 2563157 C1 | 9/2015 |
| WO | 2001054412 A1 | 7/2001 |

* cited by examiner

METHOD OF PROCESSING AND STORING IMAGES

CROSS-REFERENCE

The present application claims priority to Russian Patent Application No. 2015143269, filed Oct. 12, 2015, entitled "METHOD OF PROCESSING AND STORING IMAGES", the entirety of which is incorporated herein by reference.

FIELD

The present technology relates to methods of and systems for processing and storing images.

BACKGROUND

Mobile devices such as smart phones and tablets may be equipped with one or more cameras that enable users of the mobile devices to capture images of their surroundings. Indeed, an increasing popularity of social networking and other applications may lead to a relatively large number of images being captured by a given mobile device. Moreover, be common for many images to be similar or visually related to one another, particularly if they are taken over a relatively short period of time (i.e., burst mode) or from a similar vintage point.

Storing these visually related images locally on the mobile device may consume valuable (and sometimes scarce) memory and/or processing resources. Additionally, storing visually related images remotely, in an online storage for example, may also consume networking and storage resources, which may be limited in many cases.

SUMMARY

It is an object of the present technology to ameliorate at least some of the inconveniences present in the prior art.

According to one aspect of the present technology, there is provided a method of processing and storing images, wherein the method is executed by a server and comprising: acquiring, by the server, a first image and a second image, wherein the first image comprises a totality of pixels of the first image and the second image comprises a totality of pixels of the second image; determining, by the server, that the first image and the second image are visually related, wherein the determining that the first image and the second image are visually related comprises identifying, by the server, a set of first pixels within the first image amongst the totality of pixels of the first image and a set of second pixels within the second image amongst the totality of pixels of the second image and wherein each first pixel within the set of first pixels is visually related to a respective second pixel within the set of second pixels; determining, by the server, a first mapping information between the first image and the second image; generating, by the server, a reference image based on the first image and the second image, wherein the reference image comprising a set of synthetic pixels and wherein the generating the reference image comprises: determining, by the server, a second mapping information between the first image and the reference image; and computing, by the server, each synthetic pixel within the set of synthetic pixels based on a respective first pixel within the set of first pixels correlated to a respective synthetic pixel within the set of synthetic pixels and a respective second pixel within the set of second pixels correlated to the respective synthetic pixel within the set of synthetic pixels, wherein the computing each synthetic pixel comprises correlating, by the server, the respective first pixel to the respective synthetic pixel via the second mapping information and the respective second pixel to the respective synthetic pixel via the first and the second mapping information. The method also comprises: computing, by the server, a first parameter and a second parameter, wherein the first parameter is at least partially indicative of a visual dissimilarity between the first pixels and the respective synthetic pixels and the second parameter is at least partially indicative of the visual dissimilarity between the second pixels and the respective synthetic pixels; and storing, by the server, in a storage accessible by the server the reference image, the first parameter, the second parameter, the first mapping information and the second mapping information.

In some implementations of the method, the determining the first mapping information comprises: selecting, by the server, at least two first pixels within the first image; identifying, by the server, positions of the at least two first pixels within the first image and positions of respective visually related second pixels within the second image; and computing, by the server, a first set of transposition factors based on the positions of the at least two first pixels within the first image and the positions of the respective visually related second pixels within the second image, wherein the first set of transposition factors is indicative of the first mapping information between the first image and the second image.

In some implementations of the method, the generating the reference image further comprises: assessing, by the server, a resolution of the first image; selecting, by the server, a resolution of the reference image; and computing, by the server, a second set of transposition factors being indicative of the second mapping information between the first image and the reference image based on the resolution of the reference image and the resolution of the first image.

In some implementations of the method, the method further comprises: identifying, by the server, a set of third pixels amongst the totality of pixels of the first image, wherein each third pixel within the set of third pixels being visually unrelated to any pixel within the totality of pixels of the second image and wherein the reference image further comprises a set of first native pixels. The generating the reference image further comprises computing, by the server, each first native pixel within the set of first native pixels based on a respective third pixel within the set of third pixels correlated to a respective first native pixel. The first parameter is further at least partially indicative of the visual dissimilarity between the third pixels and the respective first native pixels.

In some implementations of the method, the computing each first native pixel comprises correlating, by the server, the respective third pixel to the respective first native pixel via the second mapping information.

In some implementations of the method, the method further comprises: identifying, by the server, a set of fourth pixels amongst the totality of pixels of the second image, wherein each fourth pixel within the set of fourth pixels being visually unrelated to any pixel within the totality of pixels of the first image and wherein the reference image further comprises a set of second native pixels. The generating the reference image further comprises computing, by the server, each second native pixel within the set of second native pixels based on a respective fourth pixel within the set of fourth pixels correlated to a respective second native pixel and wherein the second parameter is further at least partially indicative of the visual dissimilarity between the fourth pixels and the respective second native pixels.

In some implementations of the method, the computing each second native pixel comprises correlating, by the server, the respective fourth pixel to the respective second native pixel via the first and the second mapping information.

In some implementations of the method, the computing each synthetic pixel within the set of synthetic pixels further comprises computing, by the server, a distinctive synthetic pixel based on a distinctive pixel within the totality of pixels of the first image correlated to the distinctive synthetic pixel and an interpolated pixel correlated to the distinctive synthetic pixel, wherein the computing the distinctive synthetic pixel comprises computing, by the server, the interpolated pixel based on an amalgamation of pixels within the totality of pixels of the second image and wherein the first parameter is further at least partially indicative of the visual dissimilarity between the distinctive pixel within totality of pixels of the first image and the respective distinctive synthetic pixel within the reference image.

In some implementations of the method, the computing the distinctive synthetic pixel is based on the distinctive pixel within the totality of pixels of the second image correlated to the distinctive synthetic pixel and the interpolated pixel correlated to the distinctive synthetic pixel, wherein the computing the distinctive synthetic pixel comprises computing, by the server, the interpolated pixel based on the amalgamation of pixels within the totality of pixels of the first image and wherein the second parameter is further at least partially indicative of the visual dissimilarity between the distinctive pixel within totality of pixels of the second image and the respective distinctive synthetic pixel within the reference image.

In some implementations of the method, the computing the distinctive synthetic pixel further comprises correlating, by the server, the distinctive pixel within the totality of pixels of the first image to the distinctive synthetic pixel via the second mapping information and correlating the interpolated pixel to the distinctive synthetic pixel via the first and the second mapping information.

In some implementations of the method, the computing the distinctive synthetic pixel further comprises correlating, by the server 112, the distinctive pixel within the totality of pixels of the second image to the distinctive synthetic pixel via the first and the second mapping information and correlating the interpolated pixel to the distinctive synthetic pixel via the second mapping information.

In some implementations of the method, the computing the interpolated pixel comprises determining, by the server, the amalgamation of pixels within the totality of pixels of the second image based on the first and the second mapping information.

In some implementations of the method, the computing the interpolated pixel comprises determining, by the server, the amalgamation of pixels within the totality of pixels of the first image based on the second mapping information.

In some implementations of the method, the computing each synthetic pixel within the set of synthetic pixels further comprises averaging, by the server, the first pixel correlated to the respective synthetic pixel and the second pixel correlated to the respective synthetic pixel.

In some implementations of the method, the computing the distinctive synthetic pixel further comprises averaging, by the server, the distinctive pixel within the totality of pixels of the first image correlated to the distinctive synthetic pixel and the interpolated pixel correlated to the distinctive synthetic pixel.

In some implementations of the method, the computing the distinctive synthetic pixel further comprises averaging, by the server, the distinctive pixel within the totality of pixels of the second image correlated to the distinctive synthetic pixel and the interpolated pixel correlated to the distinctive synthetic pixel.

In some implementations of the method, the first and the second parameter comprise a set of first delta-pixels and a set of second delta-pixels respectively and a resolution of the first and the second image respectively, wherein the first delta-pixels within the set of first delta-pixels are indicative of the visual dissimilarity between the first pixels and the respective synthetic pixels and wherein the second delta-pixels within the set of second delta-pixels are indicative of the visual dissimilarity between the second pixels and the respective synthetic pixels.

In some implementations of the method, the first parameter further comprises the second mapping information and the second parameter further comprises the first and the second mapping information.

According to another aspect of the present technology, there is provided a method of generating a first image, wherein the first image comprises a set of first pixels and wherein the method is executed by a server. The method comprises: retrieving, by the server, from a storage accessible by the server: a second mapping information; a reference image comprising a set of synthetic pixels, wherein each synthetic pixel within the set of synthetic pixels is correlated via a second mapping information to a respective first pixel within the set of first pixels within the first image; and a first parameter, wherein the first parameter is at least partially indicative of a visual dissimilarity between first pixels within the set of first pixels and the respective synthetic pixels. The method also comprises generating, by the server, the first image based on the first parameter, the second mapping information and the reference image.

In some implementations of the method, each synthetic pixel within the set of synthetic pixels is further correlated via a first mapping information and the second mapping information to a respective second pixel within a set of second pixels within a second image. The retrieving further comprises retrieving, by the server: a first mapping information; and a second parameter, wherein the second parameter is at least partially indicative of the visual dissimilarity between second pixels within the set of second pixels and the respective synthetic pixels. The method further comprises generating, by the server, the second image based on the second parameter, the second mapping information, the first mapping information and the reference image.

In some implementations of the method, the first image further comprises a set of third pixels. The reference image further comprises a set of first native pixels, wherein each first native pixel within the set of first native pixels is correlated via the second mapping information to a respective third pixel within the set of third pixels. The first parameter is further at least partially indicative of the visual dissimilarity between the third pixels and the respective first native pixels.

In some implementations of the method, the second image further comprises a set of fourth pixels. The reference image further comprises a set of second native pixels, wherein each second native pixel within the set of second native pixels is correlated via the first and the second mapping information to a respective fourth pixel within the set of fourth pixels.

The second parameter is further at least partially indicative of the visual dissimilarity between the fourth pixels and the respective second native pixels.

In some implementations of the method, the first image further comprises a distinctive pixel. The set of synthetic pixels further comprises a distinctive synthetic pixel correlated via the second mapping information to the distinctive pixel within the first image. The first parameter is further at least partially indicative of the visual dissimilarity between the distinctive pixel within the first image and the distinctive synthetic pixel.

In some implementations of the method, the second image further comprises the distinctive pixel. The set of synthetic pixels further comprises the distinctive synthetic pixel correlated via the first and the second mapping information to the distinctive pixel within the second image. The second parameter is further at least partially indicative of the visual dissimilarity between the distinctive pixel within the second image and the distinctive synthetic pixel.

In some implementations of the method, the method further comprises sending, by the server, instructions to an electronic device for displaying the first and the second image to a user.

According to one aspect of the present technology, there is provided a server comprising a processor and a storage, wherein the storage stores computer-readable instructions and wherein the server is configured to: acquire a first image and a second image, wherein the first image comprises a totality of pixels of the first image and the second image comprising a totality of pixels of the second image; determine that the first image and the second image are visually related, wherein to determine that the first image and the second image are visually related the server is configured to identify a set of first pixels within the first image amongst the totality of pixels of the first image and a set of second pixels within the second image amongst the totality of pixels of the second image, wherein each first pixel within the set of first pixels is visually related to a respective second pixel within the set of second pixels; determine a first mapping information between the first image and the second image; generate a reference image based on the first image and the second image, wherein the reference image comprises a set of synthetic pixels, wherein to generate the reference image the server is configured to: determine a second mapping information between the first image and the reference image; and compute each synthetic pixel within the set of synthetic pixels based on a respective first pixel within the set of first pixels correlated to a respective synthetic pixel within the set of synthetic pixels and a respective second pixel within the set of second pixels correlated to the respective synthetic pixel within the set of synthetic pixels, wherein to compute each synthetic pixel the server is configured to correlate the respective first pixel to the respective synthetic pixel via the second mapping information and the respective second pixel to the respective synthetic pixel via the first and the second mapping information. The server is also configured to: compute a first parameter and a second parameter, wherein the first parameter is at least partially indicative of a visual dissimilarity between the first pixels and the respective synthetic pixels and the second parameter is at least partially indicative of the visual dissimilarity between the second pixels and the respective synthetic pixels; and store in the storage accessible by the server the reference image, the first parameter, the second parameter, the first mapping information and the second mapping information.

In some implementations of the server, wherein to determine the first mapping information the server is configured to: select at least two first pixels within the first image; identify positions of the at least two first pixels within the first image and positions of respective visually related second pixels within the second image; and compute a first set of transposition factors based on the positions of the at least two first pixels within the first image and the positions of the respective visually related second pixels within the second image, wherein the first set of transposition factors is indicative of the first mapping information between the first image and the second image.

In some implementations of the server, wherein to generate the reference image the server is further configured to: assess a resolution of the first image; select a resolution of the reference image; and compute a second set of transposition factors being indicative of the second mapping information between the first image and the reference image based on the resolution of the reference image and the resolution of the first image.

In some implementations of the server, the server is further configured to: identify a set of third pixels amongst the totality of pixels of the first image, wherein each third pixel within the set of third pixels is visually unrelated to any pixel within the totality of pixels of the second image. The reference image further comprises a set of first native pixels. To generate the reference image the server is further configured to compute each first native pixel within the set of first native pixels based on a respective third pixel within the set of third pixels correlated to a respective first native pixel. The first parameter is further at least partially indicative of the visual dissimilarity between the third pixels and the respective first native pixels.

In some implementations of the server, wherein to compute each first native pixel the server is configured to correlate, by the server, the respective third pixel to the respective first native pixel via the second mapping information.

In some implementations of the server, the server is further configured to identify a set of fourth pixels amongst the totality of pixels of the second image, wherein each fourth pixel within the set of fourth pixels is visually unrelated to any pixel within the totality of pixels of the first image. The reference image further comprises a set of second native pixels. To generate the reference image the server is further configured to compute each second native pixel within the set of second native pixels based on a respective fourth pixel within the set of fourth pixels correlated to a respective second native pixel. The second parameter is further at least partially indicative of the visual dissimilarity between the fourth pixels and the respective second native pixels.

In some implementations of the server, wherein to compute each second native pixel the server is configured to correlate the respective fourth pixel to the respective second native pixel via the first and the second mapping information.

In some implementations of the server, wherein to compute each synthetic pixel within the set of synthetic pixels the server is further configured to compute a distinctive synthetic pixel based on a distinctive pixel within the totality of pixels of the first image correlated to the distinctive synthetic pixel and an interpolated pixel correlated to the distinctive synthetic pixel, wherein to compute the distinctive synthetic pixel the server is configured to compute the interpolated pixel based on an amalgamation of pixels within the totality of pixels of the second image. The first parameter is further at least partially indicative of the visual dissimilarity between the distinctive pixel within totality of pixels of the first image and the respective distinctive synthetic pixel within the reference image.

In some implementations of the server, wherein to compute the distinctive synthetic pixel the server is configured to compute based on the distinctive pixel within the totality of pixels of the second image correlated to the distinctive synthetic pixel and the interpolated pixel correlated to the distinctive synthetic pixel, wherein to compute the distinctive synthetic pixel the server is configured to compute the interpolated pixel based on the amalgamation of pixels within the totality of pixels of the first image. The second parameter is further at least partially indicative of the visual dissimilarity between the distinctive pixel within totality of pixels of the second image and the respective distinctive synthetic pixel within the reference image.

In some implementations of the server, wherein to compute the distinctive synthetic pixel the server is further configured to correlate the distinctive pixel within the totality of pixels of the first image to the distinctive synthetic pixel via the second mapping information and to correlate the interpolated pixel to the distinctive synthetic pixel via the first and the second mapping information.

In some implementations of the server, wherein to compute the distinctive synthetic pixel the server is further configured to correlate the distinctive pixel within the totality of pixels of the second image to the distinctive synthetic pixel via the first and the second mapping information and to correlate the interpolated pixel to the distinctive synthetic pixel via the second mapping information.

In some implementations of the server, wherein to compute the interpolated pixel the server is configured to determine the amalgamation of pixels within the totality of pixels of the second image based on the first and the second mapping information.

In some implementations of the server, wherein to compute the interpolated pixel the server is configured to determine the amalgamation of pixels within the totality of pixels of the first image based on the second mapping information.

In some implementations of the server, wherein to compute each synthetic pixel within the set of synthetic pixels the server is further configured to average the first pixel correlated to the respective synthetic pixel and the second pixel correlated to the respective synthetic pixel.

In some implementations of the server, wherein to compute the distinctive synthetic pixel the server is further configured to average the distinctive pixel within the totality of pixels of the first image correlated to the distinctive synthetic pixel and the interpolated pixel correlated to the distinctive synthetic pixel.

In some implementations of the server, wherein to compute the distinctive synthetic pixel the server is further configured to average the distinctive pixel within the totality of pixels of the second image correlated to the distinctive synthetic pixel and the interpolated pixel correlated to the distinctive synthetic pixel.

In some implementations of the server, wherein the first and the second parameter comprise a set of first delta-pixels and a set of second delta-pixels respectively and a resolution of the first and the second image respectively, the first delta-pixels within the set of first delta-pixels being indicative of the visual dissimilarity between the first pixels and the respective synthetic pixels, the second delta-pixels within the set of second delta-pixels being indicative of the visual dissimilarity between the second pixels and the respective synthetic pixels.

In some implementations of the server, wherein the first parameter further comprises the second mapping information and the second parameter further comprises the first and the second mapping information.

According to another aspect of the present technology, there is provided a server comprising a processor and a storage, wherein the storage stores computer-readable instructions and wherein the server is configured to: retrieve from the storage accessible by the server: a second mapping information; a reference image comprising a set of synthetic pixels, wherein each synthetic pixel within the set of synthetic pixels is correlated via a second mapping information to a respective first pixel within the set of first pixels within the first image; and a first parameter, wherein the first parameter is at least partially indicative of a visual dissimilarity between first pixels within the set of first pixels and the respective synthetic pixels. The server is also configured to generate the first image based on the first parameter, the second mapping information and the reference image.

In some implementations of the server, each synthetic pixel within the set of synthetic pixels is further correlated via a first mapping information and the second mapping information to a respective second pixel within a set of second pixels within a second image. The server is further configured to retrieve: a first mapping information; and a second parameter, wherein the second parameter is at least partially indicative of the visual dissimilarity between second pixels within the set of second pixels and the respective synthetic pixels. The server is further configured to generate the second image based on the second parameter, the second mapping information, the first mapping information and the reference image.

In some implementations of the server, the first image further comprises a set of third pixels. The reference image further comprises a set of first native pixels, wherein each first native pixel within the set of first native pixels is correlated via the second mapping information to a respective third pixel within the set of third pixels. The first parameter is further at least partially indicative of the visual dissimilarity between the third pixels and the respective first native pixels.

In some implementations of the server, the second image comprises a set of fourth pixels. The reference image further comprises a set of second native pixels, wherein each second native pixel within the set of second native pixels is correlated via the first and the second mapping information to a respective fourth pixel within the set of fourth pixels. The second parameter is further at least partially indicative of the visual dissimilarity between the fourth pixels and the respective second native pixels.

In some implementations of the server, the first image further comprises a distinctive pixel. The set of synthetic pixels further comprises a distinctive synthetic pixel correlated via the second mapping information to the distinctive pixel within the first image. The first parameter is further at least partially indicative of the visual dissimilarity between the distinctive pixel within the first image and the distinctive synthetic pixel.

In some implementations of the server, the second image further comprises the distinctive pixel. The set of synthetic pixels further comprises the distinctive synthetic pixel correlated via the first and the second mapping information to the distinctive pixel within the second image. The second parameter is further at least partially indicative of the visual dissimilarity between the distinctive pixel within the second image and the distinctive synthetic pixel.

In some implementations of the server, the server is further configured to send instructions to an electronic device for displaying the first and the second image to a user.

In the context of the present specification, unless expressly provided otherwise, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless expressly provided otherwise, "client device" is any computer hardware that is capable of running software appropriate to the relevant task at hand. Thus, some (non-limiting) examples of client devices include personal computers (desktops, laptops, netbooks, etc.), smartphones, and tablets. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless expressly provided otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the expression "component" is meant to include software (appropriate to a particular hardware context) that is both necessary and sufficient to achieve the specific function(s) being referenced.

In the context of the present specification, unless expressly provided otherwise, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, the expression "interactive" is meant to indicate that something is responsive to a user's input or that at least portions thereof are responsive to a user's input.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication. Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DESCRIPTION

Figure 1:
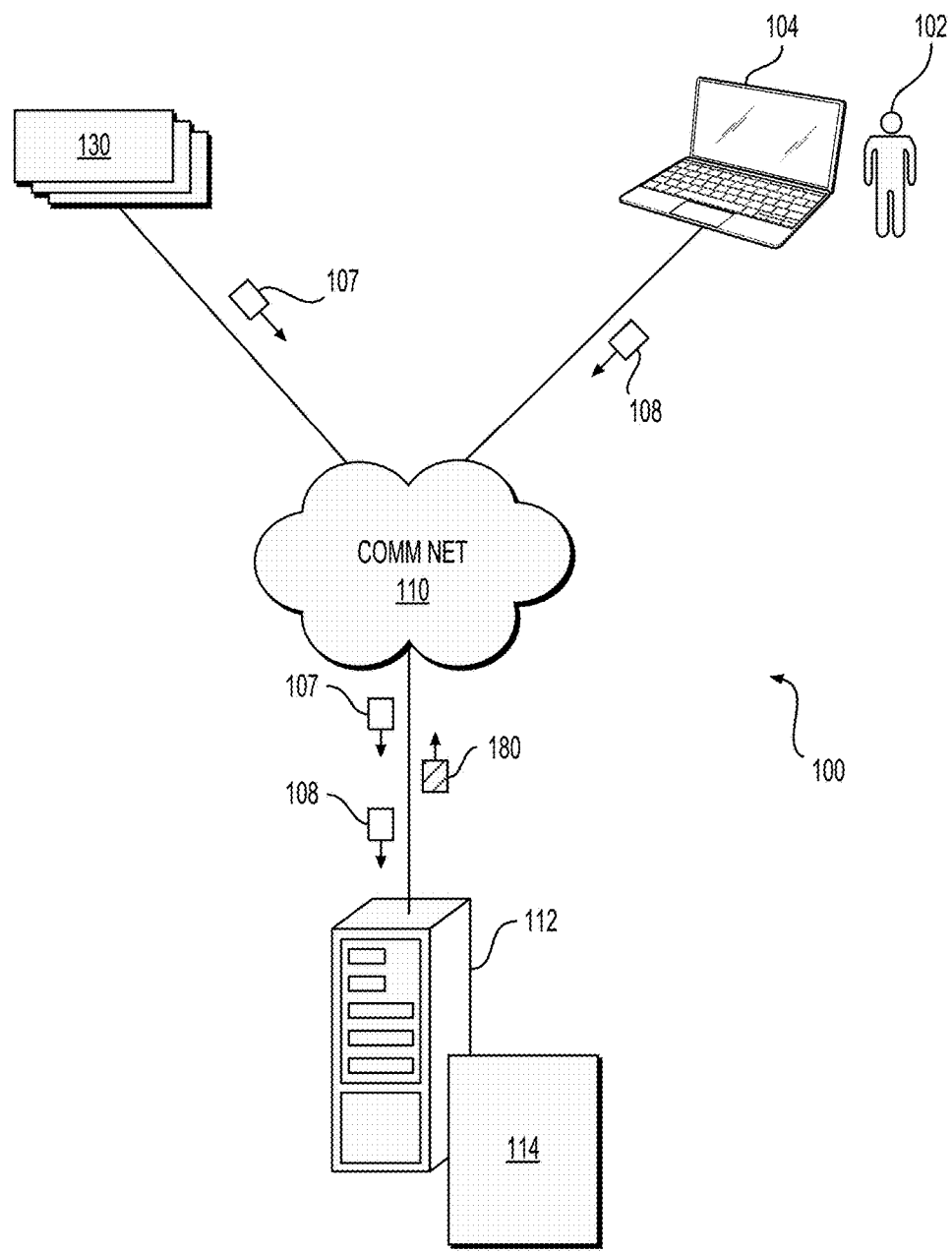
FIG. 1 is a schematic diagram of a system being a non-limiting implementation of the present technology.

In FIG. 1 there is depicted a schematic diagram of a system 100 which is linked via a communication network 110. It is to be expressly understood that the system 100 is depicted as an illustrative implementation of the present technology. Thus, the following description should be considered only as the description of illustrative implementation of the present technology. This description is not intended to define the scope or set forth the bounds of the present technology. In some cases, what are believed to be helpful examples of modifications to the system 100 may also be described below. This is done merely as an aid to understanding, and, again, not to define the scope or set forth the bounds of the present technology. These modifications are not an exhaustive list, and, as a person skilled in the art would understand, other modification are likely possible. Further, where no examples of modifications have been set forth, it should not be interpreted that no modifications are possible and/or that what is described is the sole manner of implementing that, element of the present technology. As a person skilled in the art would understand, this is likely not the case. In addition it is to be understood that the networking system 100 may provide in certain instances simple implementations of the present technology, and that where such is the case they have been presented in this manner as an aid to understanding. As persons skilled in the art would understand, various implementations of the present technology may be of a greater complexity.

How a communication link (not depicted) is implemented is not particularly limited and will depend on which devices are connected to the communication network 110. As a non-limiting example, the connection of a server 112 to the communication network 110 can be implemented via a wired connection (such as an Ethernet based connection). At the same time, other devices could be also connected in other ways. In those examples, where an electronic device 104 is implemented as a wireless communication device (e.g. a smartphone), the connection can be implemented as a wireless communication network (such as but not limited to, a 3G communications network link, a 4G communications network link, a Wireless Fidelity, or WiFi® for short, Bluetooth® and the like). In those examples, where the electronic device 104 is implemented as a desktop computer, the communication link can be either wireless or wired (such as an Ethernet based connection).

The system 100 may comprise the server 112. The server 112 may be implemented as a conventional computer server.

In an example of an embodiment of the present technology, the server 112 may be implemented as a Dell™ PowerEdge™ Server running the Microsoft™ Windows Server™ operating system. Needless to say, the server 112 may be implemented in any other suitable hardware and/or software and/or firmware or a combination thereof. In the depicted non-limiting embodiment of present technology, the server 112 is a single server. In alternative non-limiting embodiments of the present technology, the functionality of the server 112 may be distributed and may be implemented via multiple servers. In some embodiments, the server 112 may comprise a search engine (not depicted) and may be further under control of a search engine provider such as Yandex™.

The server 112 includes a storage 114 that may be used by the server 112. Generally, the storage 114 may be implemented as a medium of any nature and kind whatsoever, including RAM, ROM, disks (CD-ROMs, DVDs, floppy disks, hard drivers, etc.), USB keys, solid state-drives, tape drives, etc. and also the combinations thereof.

The implementations of the server 112 are well known in the art. So, suffice it to state, that the server 112 comprises inter alia a network communication interface (such as a modem, a network card and the like) (not depicted) for two-way communication over the communication network 110; and a processor (not depicted) coupled to the network communication interface, the processor being configured to execute various routines, including those described herein below. To that end the processor may store or have access to computer readable instructions stored in the storage 114, which instructions, when executed, cause the processor to execute the various routines described herein. The storage 114 of the server 112 is configured to store data including computer-readable instructions and databases.

In some implementations, the storage 114 is configured to store various data such as image data. In some embodiments, the image data may comprise image files corresponding to a plurality of images. Each image file may be associated with one of a variety of file formats such as JPEG, Exif, TIFF, GIF, BMP, PNG, HDR, and the like. In other words, the image data may comprise the image files corresponding to the plurality of images being in compressed, uncompressed or vector formats. In additional embodiments, the image data may comprise frames of a video. In another embodiment, the storage 114 may store additional data for executing at least some functionalities of the server 112 described herein.

The system 100 further comprises the electronic device 104. The electronic device 104 is associated with a user 102. It should be noted that the fact that the electronic device 104 is associated with the user 102 does not need to suggest or imply any mode of operation—such as a need to log in, a need to be registered or the like. The electronic device 104 includes an information storage (not depicted). Generally, the information storage may be implemented as a medium of any nature and kind whatsoever, including RAM, ROM, disks (CD-ROMs, DVDs, floppy disks, hard drivers, etc.), USB keys, solid state-drives, tape drives, etc. and also the combinations thereof. The information storage may store user files and program instructions. In some embodiments, the information storage may store the image data corresponding to a first set 202 of images depicted in FIG. 2 having been saved thereon.

The implementation of the electronic device 104 is not particularly limited, but as an example, the electronic device 104 may be implemented as a personal computer (desktops, laptops, netbooks, etc.), as a wireless communication device (a cell phone, a smartphone, a tablet and the like). In FIG.

1, the electronic device 104 is implemented as a laptop, such as for example, Apple™ MacBook Pro™ laptop.

Furthermore, the system 100 may comprise public information sources 130 connected to the server 112 via the communication network 110. In some implementations, the public information sources 130 may comprise internet resources that provide services where end-users explicitly share various images. For example, the public information sources 130 may further comprise image-sharing services such as Flickr™, Instagram™, Yandex.Photos™ or the like, which are common sources of the image data. In another embodiment, the public information sources 130 may comprise the image data corresponding to a second set 204 of images depicted in FIG. 2.

In some embodiments, as depicted in FIG. 1, a data packet 108 may be received by the server 112 via the communication network 110 from the electronic device 104. The data packet 108 may comprise the image data corresponding to the first set 202 of images. In other embodiments, the data packet 108 may comprise the image data corresponding to at least some images within the first set 202 of images. In further embodiments, the data packet 108 may be a first plurality of data packets received by the server 112 from the electronic device 104. For example, each data packet within the first plurality of data packet may comprise the image data corresponding to a respective image within the first set 202 of images.

In some embodiments, a data packet 107 may be received by the server 112 via the communication network 110 from the public information sources 130. The data packet 107 may comprise the image data corresponding to the second set 204 of images. In other embodiments, the data packet 108 may comprise the image data corresponding to at least some images within the second set 204 of images. In further embodiments, the data packet 108 may be a second plurality of data packets received by the server 112 from the public information sources 130. For example, each data packet within the second plurality of data packets may comprise the image data corresponding to a respective image within the second set 204 of images. In another example, each data packet within the second plurality of data packets may be sent from a respective public source within the public information sources 130.

In alternative embodiments, only the data packet 107 amongst the data packets 107 and 108 may be received by the server 112. In further embodiments, solely the data packet 108 amongst the data packets 107 and 108 may be received by the server 112. In yet further embodiments, the server 112 may receive the image data from an additional data image source (not depicted). In other words, the image data may be received by the server 112 from a plurality of sources not limited to those depicted in FIG. 1. Therefore, it should be noted however that sources of the image data mentioned above should not be considered as exhaustive sources of the image data from which the server 112 may receive the image data and that other sources of the image data may be contemplated in other implementations of the present technology.

Figure 2:
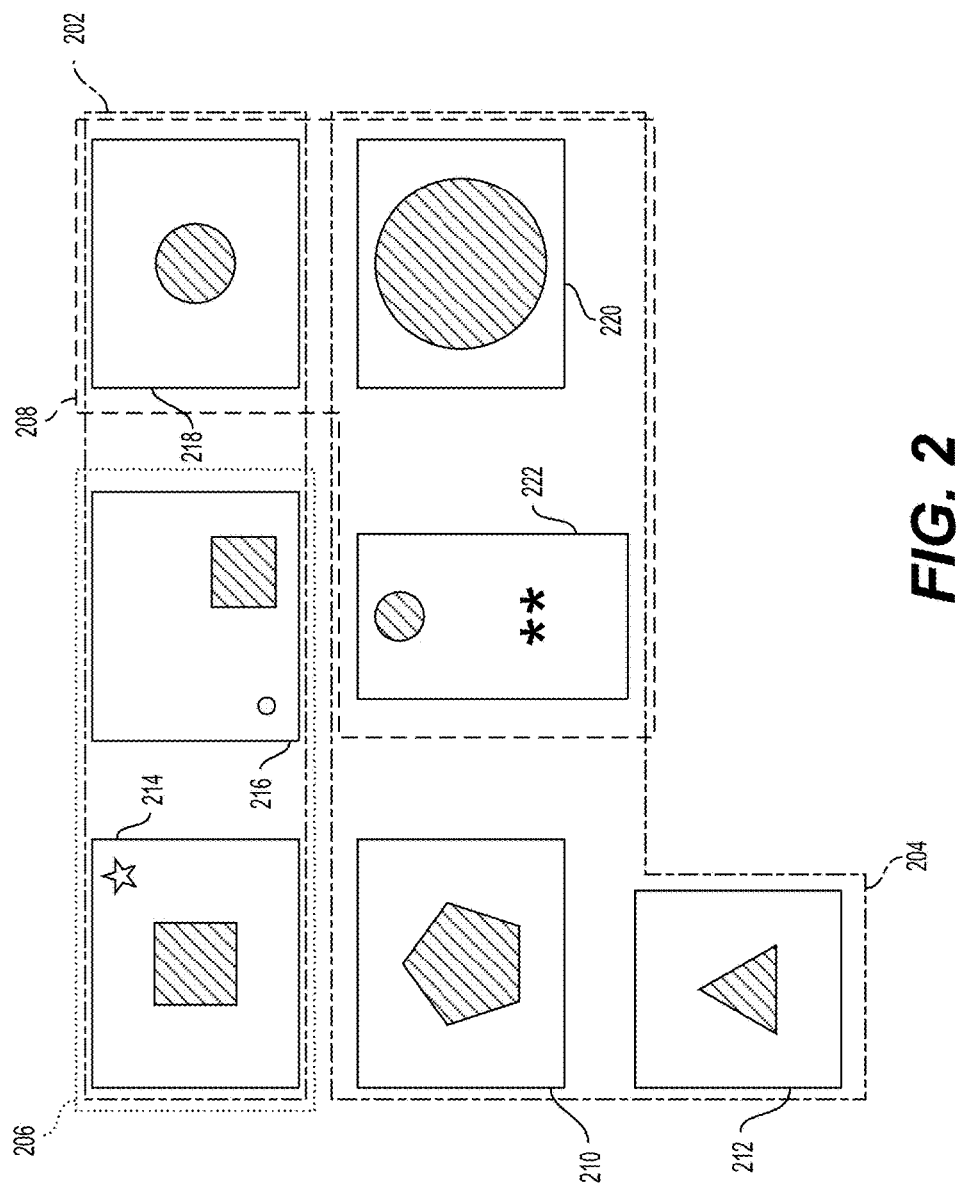
FIG. 2 illustrates subsets of visually related images that are clustered by a server according to an implementation of the present technology.

In some embodiments of the present technology, upon receiving the data packets 107 and/or the data packet 108, the server 112 may be configured to cluster the images corresponding to the first set 202 and/or second set 204 of images into a first subset 206 of images and a second subset 208 of images as depicted in FIG. 2. In particular, the server 112 may be configured to cluster the image data corresponding to the first set 202 and/or second set 204 of images into the first subset 206 of images and the second subset 208 of images wherein each subset of images comprises visually related images. In other words, each subset of images may comprise images which have been determined to be similar, alike, identical, almost identical or that visually "look-alike".

The clustering of images into the first subset 206 of images and the second subset 208 of images may be performed by the server 112 using various computer vision techniques. The various computer vision techniques are known in the art and are typically used to cluster the visually related images. For example, the various computer vision techniques may use Scale-Invariant Feature transformation (SIFT) for identifying points of interest in various images and defining scaled, rotated frames around each point of interest. Features in each frame may represent a presence of edges at multiple scales and orientations. This means that such a computer vision technique may determine that two images are visually related even though if the two images are spatially shifted, rotated and/or scaled. In another example, the computer vision techniques may compute geometric blurs or shock graphs for determining whether the two images are visually related as a person skilled in the art will understand. Therefore, the server 112 may cluster the image data corresponding to the first set 202 and/or second set 204 of images into the first subset 206 of images and the second subset 208 of images using the various computer vision techniques. It should be noted that various computer vision techniques previously mentioned for clustering the image data corresponding to the first set 202 and/or second set 204 of images into the first subset 206 of images and the second subset 208 of images have been presented for explanation purpose only. Other techniques for clustering the image data corresponding to the first set 202 and/or second set 204 of images into the first subset 206 of images and the second subset 208 of images may be contemplated in alternative implementations of the present technology.

With reference to FIG. 2, in some embodiments, the server 112 may determine that images 214 and 216 are visually related to each other. Similarly, the server 112 may determine that images 218, 220 and 222 are visually related to each other. It should be noted that images 210 and 212 have not been clustered since the server 112 may determine that the images 210 and 212 are not visually related to any other image received by the server 112.

In alternative embodiments, any one of the subsets 206 and 208 of images may comprise images with different resolutions. For example, the image 222 of the second subset 208 of images has a different resolution than the image 220 of the second subset 208 of images.

The server 112 may further identify a first image in each of the first subset 206 and the second subset 208 of images for each of the first subset 206 and the second subset 208 of images, respectively. As it will be further explained, identifying the first image may enable the server 112 to determine positional relationships between at least some visually related images. The identification of the first image may be executed by the server 112 via various techniques. For example, the identification of the first image may be executed via a random selection or a direct search algorithm, as it is known in the art. Needless to say, other techniques of identifying the first image in each of the first subset 206 and the second subset 208 of images for each of the first subset 206 and the second subset 208 of images respectively may be contemplated in further implementations of the present technology.

Figure 3:
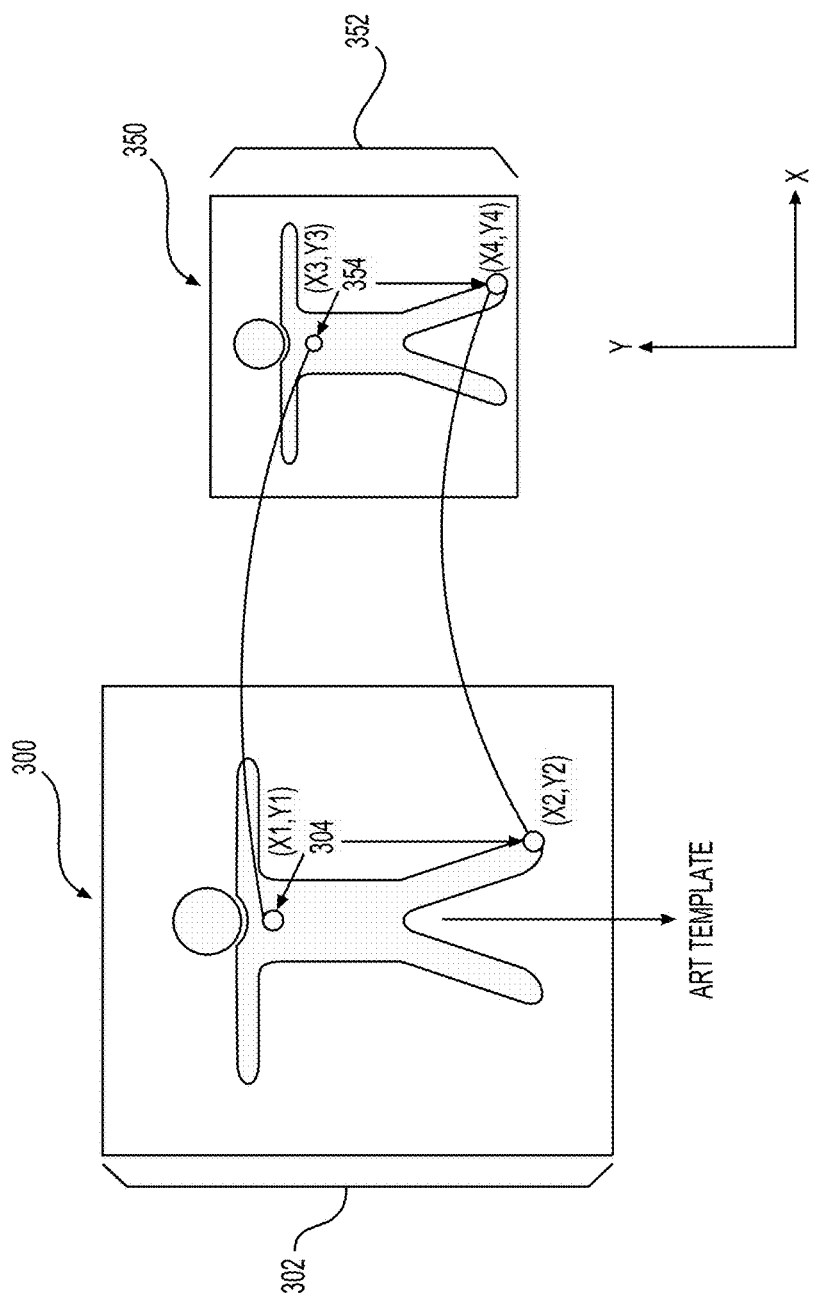
FIG. 3 illustrates how a first mapping information between two visually related images is determined by a server which is then stored within a storage according to an embodiment of the present technology.

In some embodiments of the present technology, the server 112 may determine the first mapping information between the first image and the second image. With reference to FIG. 3, there is depicted a first image 300 and a second image 350 that are determined to be visually related by the server 112. The first image 300 may comprise a totality 302 of pixels of the first image 300 and the second image 350 may comprise a totality 352 of pixels of the second image 350. The server 112 may identify a set of first pixels within the first image 300 amongst the totality 302 of pixels of the first image 300 and a set of second pixels within the second image 350 amongst the totality 352 of pixels of the second image 350 where each first pixel within the set of first pixels is visually related to a respective second pixel within the set of second pixels. The server 112 may identify the first set of pixels and the second set of pixels via the various computer vision techniques mentioned above. Further, the server 112 may select at least two first pixels 304 within the first image 300 for determining the first mapping information. The server 112 may identify positions (i.e., [x1,y1] and [x2,y2]) of the at least two first pixels 304 within the first image 300 and positions (i.e., [x3,y3] and [x4,y4]) of respective visually related second pixels 354 within the second image 350. Based on the positions (i.e., [x1,y1] and [x2,y2]) of the at least two first pixels 304 within the first image 300 and the positions (i.e., [x3,y3] and [x4,y4]) of the respective visually related second pixels 354 within the second image 350, the server 112 may compute a first set of transposition factors being indicative of the first mapping information between the first image 300 and the second image 350.

For example, the first mapping information between the first image 300 and the second image 350 may be computed by the server 112 and represented as a matrix:

$$M1 = \begin{bmatrix} K_x & D_x \\ K_y & D_y \end{bmatrix} \quad (1)$$

where $K_x$ and $K_y$ are transposition factors for scaling (i.e., a first transposition scaling factor for an x direction and a second transposition scaling factor for a y direction), $D_x$ and $D_y$ are the transposition factors for shifting (i.e., a first transposition shifting factor for a shift along the x direction and a second transposition shifting factor for a shift along the y directions). This means that matrix M1 comprises the first set of transposition factors Kx, Ky, Dx and Dy which are indicative of the first mapping information between the first image 300 and the second image 350. In other words, the first mapping information enables the server 112 to determine a positional relationship between the first pixels within the first image 300 and the respective visually related second pixels within the second image 350.

In some embodiments, the first mapping information may further comprise transposition factors for rotation, for example, if the second image 350 is rotated with respect to the first image 300. This means that a dimensionality of the mapping information may vary from the dimensionality of the matrix M1 (1) in some implementations of the present technology.

In other embodiments, the server 112 may generate a reference image. How the reference image is generated by the server 112 will be described further below.

Scenario 1: Reference Image Comprising Synthetic Pixels

Figure 4:
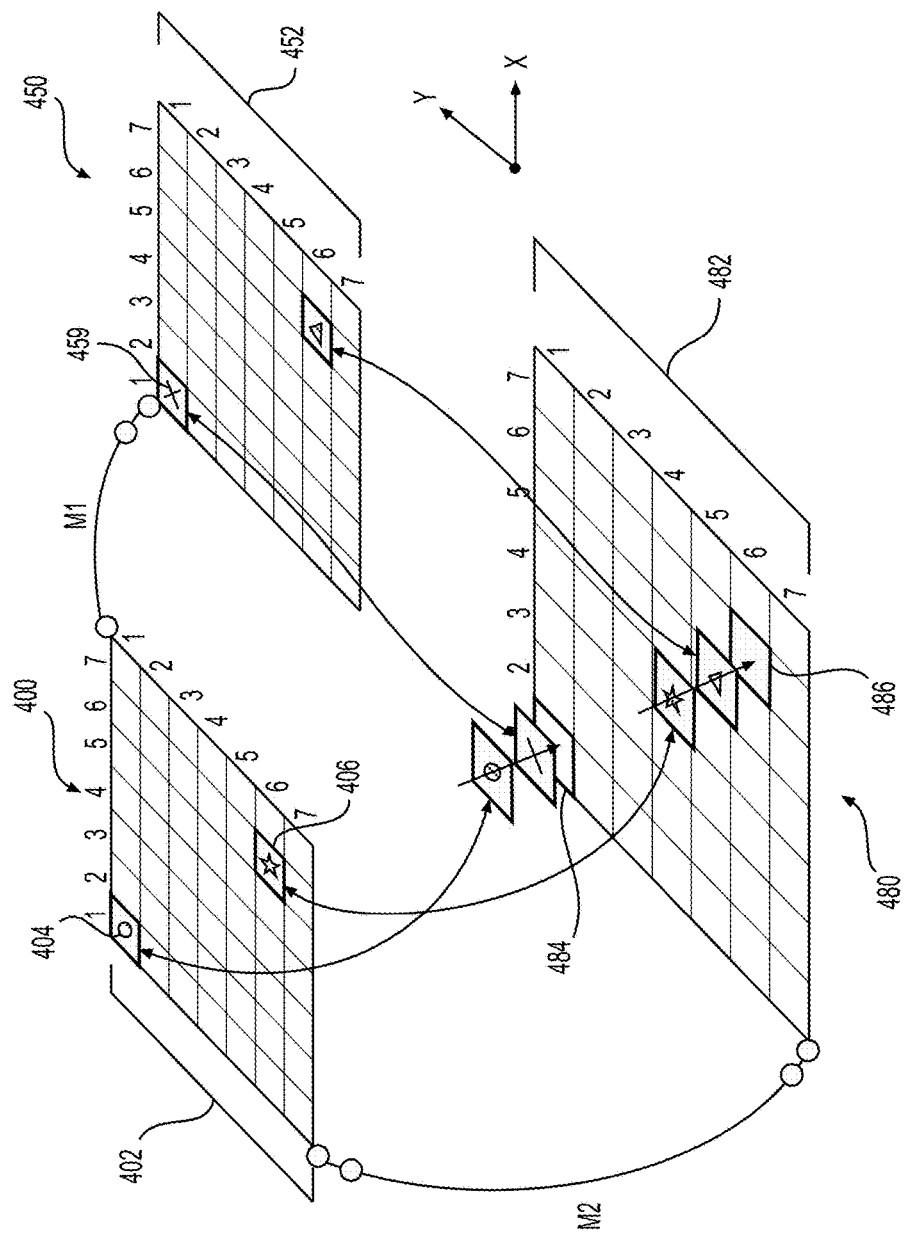
FIG. 4 illustrates the generation of a reference image according to an embodiment of the present technology.

With reference to FIG. 4, there is depicted a first image 400 comprising a totality 402 of pixels of the first image 400 and a second image 450 comprising a totality 452 of pixels of the second image 450. Let's say that the server 112 determined that the first image 400 and the second image 450 are visually related. The server may have identified that each pixel of the totality 402 of pixels of the first image 400 is visually related to a respective pixel of the totality 452 of pixels of the image 450. In this case, the set of first pixels may be the totality 402 of pixels of the first image 400 and each first pixel within the set of first pixels may be visually related to the respective second pixel within the set of second pixels amongst the totality 452 of pixels of the second image 450. As mentioned above, the server 112 may determine the first mapping information between the first image 400 and the second image 450, which is depicted in FIG. 4 as M1, based on the positions of at least two first pixels 404 and 406 within the first image 400 and the positions of respective visually related second pixels 454 and 456 within the second image 450.

In some embodiments, the server 112 may generate a reference image 480. Generating the reference image 480 may comprise assessing a resolution of the first image 400. For example, in this case the server 112 may assess the resolution of the first image 400 as 7 pixels by 7 pixels. The server 112 may select a resolution of the reference image 480.

In some embodiments, the server 112 may select the resolution of the reference image 480 to be equal to the resolution of the first image 400 or to the resolution of the second image 450. In other embodiments, the server 112 may select the resolution of the reference image 480 to be equal to any resolution predefined by a human assessor. The human assessor may predefine a particular resolution for selection thereof by the server 112 for generating the reference image 480 depending on various storage requirements. As a person skilled in the art will understand, some images having higher resolutions necessitate higher storage requirements than other images having lower resolutions. It should be noted that the server 112 selecting the resolution of the reference image 480 to be equal to the resolution of the first image 400 in this scenario is illustrated for ease of explanation only.

In other embodiments, the server 112 may compute a second set of transposition factors that are indicative of a second mapping information between the first image 400 and the reference image 480. For example, the server 112 may compute the second set of transposition factors based on the resolution of the reference image 480 and the resolution of the first image 400. In other words, the second mapping information between the first image and the reference image 480 depends on the resolution of the reference image 480 selected by the server 112. The second mapping information is depicted in FIG. 4 as M2.

In additional embodiments, the server 112 may compute the reference image 480 comprising a set 482 of synthetic pixels. To this end, the server 112 may compute each synthetic pixel within the set 482 of synthetic pixels based on a respective first pixel within the set of first pixels correlated to a respective synthetic pixel within the set 482 of synthetic pixels and a respective second pixel within the set of second pixels correlated to the respective synthetic pixel within the set 482 of synthetic pixels.

For example, the server 112 may compute a synthetic pixel 484 based on the first pixel 404 within the set of first pixels correlated to the synthetic pixel 484 within the set 482 of synthetic pixels and based on the second pixel 454 within the set of second pixels correlated to the synthetic pixel 484 within the set 482 of synthetic pixels. Let's say that the server 112 is about to generate the synthetic pixel 484. The server 112 may identify a position of the synthetic pixel 484 as [1, 1]. Via the second mapping information, the server 112 may identify a position of the first pixel 404, which is correlated to the synthetic pixel 484, as [1, 1]. Via the first and the second mapping information, the server 112 may identify a position of the second pixel 454, which is correlated to the synthetic pixel 484, as [1, 1].

In another example, the server 112 may compute a synthetic pixel 486 based on the first pixel 406 within the set of first pixels correlated to the synthetic pixel 486 within the set 482 of synthetic pixels and based on the second pixel 456 within the set of second pixels correlated to the synthetic pixel 486 within the set 482 of synthetic pixels. Let's say that the server 112 is about to generate the synthetic pixel 486. The server 112 may identify a position of the synthetic pixel 486 as [6, 6]. Via the second mapping information, the server 112 may identify a position of the first pixel 406, which is correlated to the synthetic pixel 484, as [6, 6]. Via the first and the second mapping information, the server 112 may identify a position of the second pixel 456, which is correlated to the synthetic pixel 484, as [6, 6].

Therefore, the server 112 may correlate the first pixel 404 to the synthetic pixel 484 via the second mapping information and may correlate the second pixel 454 to the synthetic pixel 484 via the first and the second mapping information. Similarly, the server 112 may correlate the first pixel 406 to the synthetic pixel 486 via the second mapping information and may correlate the second pixel 456 to the synthetic pixel 486 via the first and the second mapping information.

In other words, the second mapping information enables the server 112 to determine the positional relationship between the first pixel 404 and the synthetic pixel 484. The first mapping information enables the server 112 to determine the position relationship between the first pixel 404 and the second pixel 454. This means that the server 112 may determine the positional relationship between the second pixel 454 and the synthetic pixel 484 via the first mapping information and the second mapping information. Similarly, the second mapping information enables to determine the positional relationship between the first pixel 406 and the synthetic pixel 486. The first mapping information enables the server 112 to determine the position relationship between the first pixel 406 and the second pixel 456. This means that the server 112 may determine the positional relationship between the second pixel 456 and the synthetic pixel 486 via the first mapping information and the second mapping information.

Generally speaking, any pixel may correspond to a set of color parameters [R, G, B]. As a person skilled in the art will understand, a first color parameter refers to Red color, a second color parameter refers to Green color and a third color parameter refers to Blue color.

In some embodiments of the present technology, computing the synthetic pixel 484 within the set 482 of synthetic pixels may further comprise averaging the first pixel 404 correlated to the synthetic pixel 484 and the second pixel 454 correlated to the synthetic pixel 484. Also, computing the synthetic pixel 486 within the set 482 of synthetic pixels may further comprise averaging the first pixel 406 correlated to the synthetic pixel 486 and the second pixel 456 correlated to the synthetic pixel 486. For example, if the first pixel 404 corresponds to the set of color parameters [R1, G1, B1] and the second pixel 454 corresponds to the set of color parameters [R2, G2, B2], averaging the first pixel 404 and the second pixel 454 will result in the synthetic pixel 484 corresponding to the set of color parameters [(R1+R2)/2, (G1+G2)/2, (B1+B2)/2]. Similarly, if the first pixel 406 corresponds to the set of color parameters [R3, G3, B3] and the second pixel 456 corresponds to the set of color parameters [R4, G4, B4], averaging the first pixel 406 and the second pixel 456 will result in the synthetic pixel 486 corresponding to the set of color parameters [(R3+R4)/2, (G3+G4)/2, (B3+B4)/2].

It should be noted that any other technique for averaging the first pixel 404 and the second pixel 454 and/or the first pixel 406 and the second pixel 456 may be contemplated in further implementations of the present technology.

In some embodiments, the server 112 may compute a first parameter and a second parameter. The first parameter may be at least partially indicative of a visual dissimilarity between the first pixels and the respective synthetic pixels. The second parameter may be at least partially indicative of the visual dissimilarity between the second pixels and the respective synthetic pixels.

Figure 9:
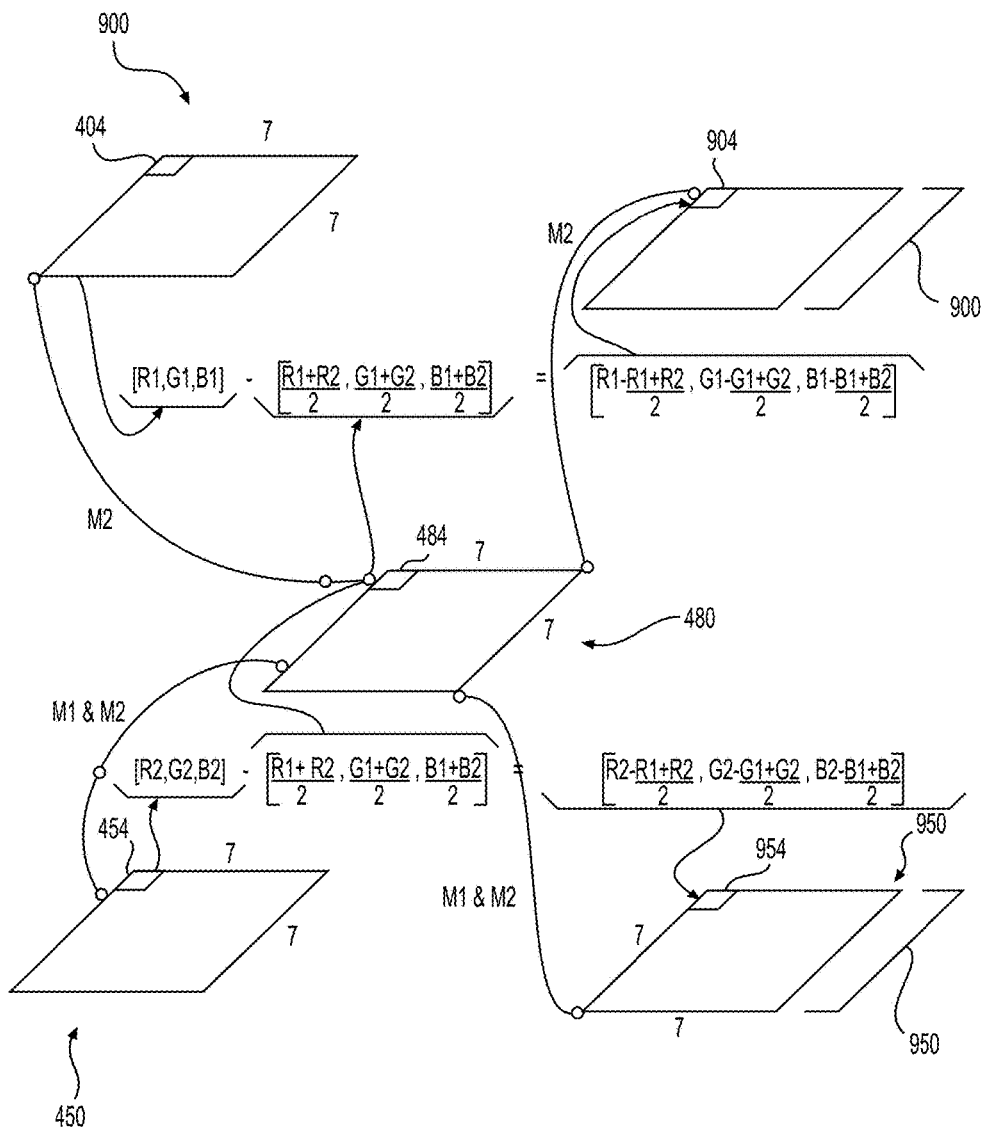
FIG. 9 illustrates the computation of a first and a second set of delta-pixels for a first and a second parameter, respectively, according to some embodiment of the present technology.

For example, with reference to FIG. 9, the first parameter may comprise inter alia a set 900 of first delta-pixels and the second parameter may comprise inter alia a set 950 of second delta pixels. First delta-pixels within the set 900 of first delta-pixels may be at least partially indicative of the visual dissimilarity between the first pixels and the respective synthetic pixels. Second delta-pixels within the set 950 of second delta-pixels may be at least partially indicative of the visual dissimilarity between the second pixels and the respective synthetic pixels.

For example, a first delta-pixel 904 within the set 900 of first delta-pixels being indicative of the visual dissimilarity between the first pixel 404 and the synthetic pixel 484 may correspond to the set of color parameters [R1−(R1+R2)/2, G1−(G1+G2)/2, B1−(B1+B2)/2]. In other words, the first delta-pixel 904 within the set 900 of first delta-pixels being indicative of the visual dissimilarity between the first pixel 404 and the synthetic pixel 484 may correspond to a difference between the set of color parameters of the first pixel 404 and the set of color parameters of the synthetic pixel 484.

In another example, a second delta-pixel 954 within the set 950 of second delta-pixels is indicative of the visual dissimilarity between the second pixel 454 and the synthetic pixel 484 may correspond to the set of color parameters [R2−(R1+R2)/2, G2−(G1+G2)/2, B2−(B1+B2)/2]. In other words, the second delta-pixel 954 within the set 950 of second delta-pixels being indicative of the visual dissimilarity between the second pixel 454 and the synthetic pixel 484 may correspond to the difference between the set of color parameters corresponding to the second pixel 454 and the set of color parameters corresponding to the synthetic pixel 484.

In additional embodiments, the first parameter may comprise an indication of the resolution of the first image 400 and the second parameter may comprise an indication of the resolution of the second image 450. Also, the first parameter may comprise the second mapping information and the second parameter may comprise the first and the second mapping information. It should be noted that, the second parameter may comprise a combined mapping information being a combination of the first mapping information and the second mapping information. As mentioned above, the second mapping information enables the server 112 to determine the positional relationship between the first pixel 404 and the synthetic pixel 484 and the first mapping information enables to determine the position relationship between the first pixel 404 and the second pixel 454. Therefore, the combined mapping information may enable the server 112 to determine the positional relationship between any second pixel and the respective synthetic pixel.

In another embodiment, the server 112 may be configured to store in the storage 114 the reference image 480, the first parameter and the second parameter. In alternative embodiments, the server 112 may be further configured to store in the storage 114 the first mapping information and the second mapping information.

In further embodiments, the server 112 may generate the first image 400 based on the first parameter, the second mapping information and the reference image 480. To this end, the server 112 may retrieve from the storage 114 the second mapping information, the reference image 480 and the first parameter. The server 112 may generate each first pixel of the first image 400 by adding the set of color parameters corresponding to the respectively correlated synthetic pixel within the reference image 480 with the set of color parameters corresponding to the respective first delta-pixel within the set 900 of first delta-pixels.

For example, the server 112 may determine the position of the synthetic pixel 484 within the reference image 480. Via the second mapping information, the server 112 may determine a position of the respective first delta-pixel 904. The server 112 may add the set of color parameters of the synthetic pixel 484 to the set of color parameters of the first delta-pixel 904 to determine the set of color parameters of the first pixel 404. Via the second mapping information, the server 112 may determine the position of the first pixel 404 within the first image 400 for generating the first pixel 404 at the position of the first pixel 404 within the first image 400.

In additional embodiments, the server 112 may generate the second image 450 based on the second parameter, the first and the second mapping information and the reference image 480. To this end, the server 112 may retrieve from the storage 114 the first and the second mapping information, the reference image 480 and the second parameter. The server 112 may generate each second pixel of the second image 450 by adding the set of color parameters corresponding to the respectively correlated synthetic pixel within the reference image 480 with the set of color parameters corresponding to the respective second delta-pixel within the set 950 of second delta-pixels.

For example, the server 112 may determine the position of the synthetic pixel 484 within the reference image 480. Via the first and the second mapping information, the server 112 may determine a position of the respective second delta-pixel 954. The server 112 may add the set of color parameters of the synthetic pixel 484 to the set of color parameters of the second delta-pixel 954 to determine the set of color parameters of the second pixel 454. Via the first and the second mapping information, the server 112 may determine the position of the second pixel 454 within the second image 450 for generating the second pixel 454 at the position the position of the second pixel 454 within the second image 450.

Scenario 2: Reference Image Comprising Synthetic Pixels and First Native Pixels

Figure 5:
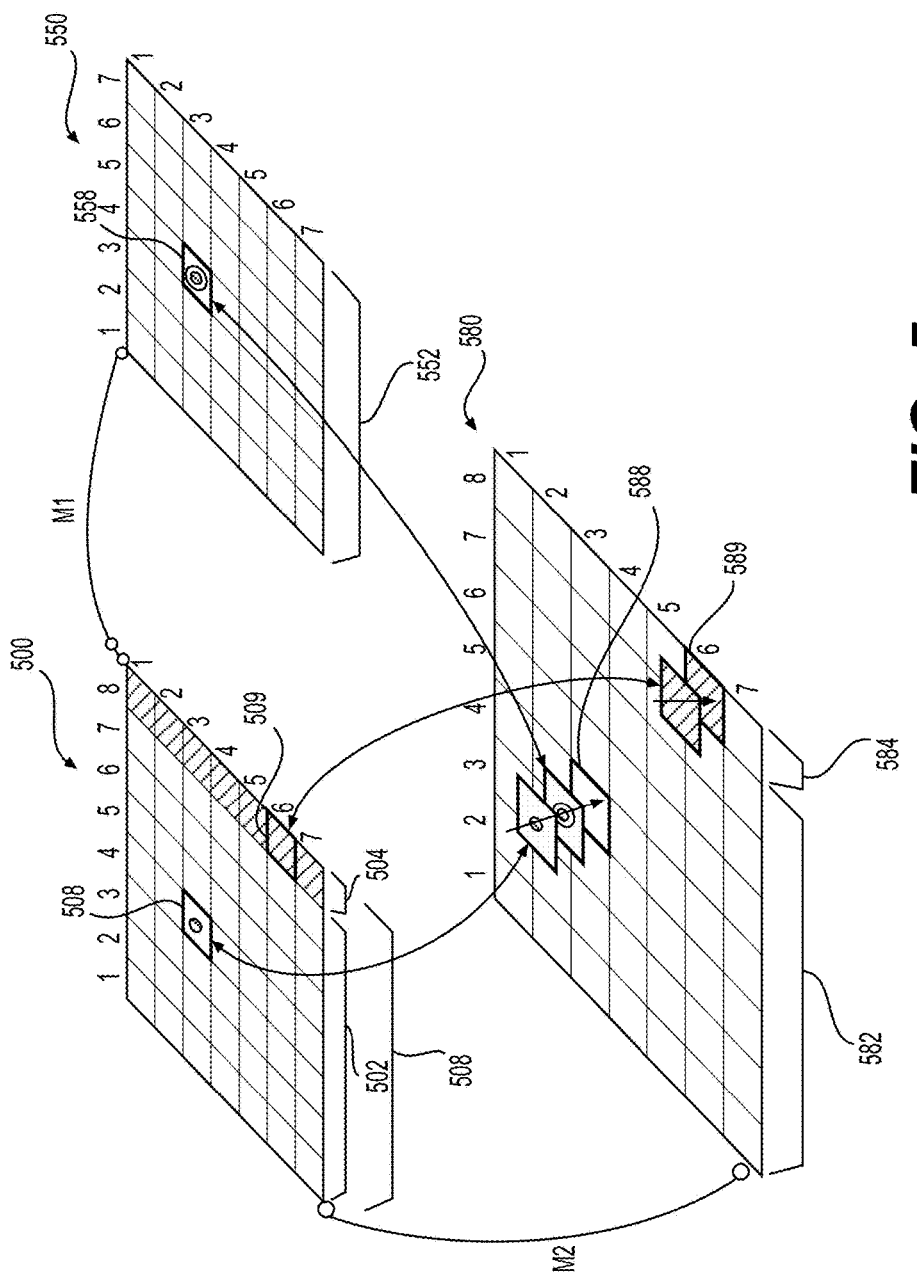
FIG. 5 illustrates the generation of another reference image according to another embodiment of the present technology.

With reference to FIG. 5, there is depicted a first image 500 comprising a totality 506 of pixels of the first image 500 and a second image 550 comprising a totality 552 of pixels of the second image 550. Let's say that the server 112 determined that the first image 500 and the second image 550 are visually related. The server 112 may have identified a set 502 of first pixels amongst the totality 506 of pixels of the first image 500 wherein each first pixel is visually related to the respective second pixel within the totality 552 of pixels of the second image 550. In this case, the totality 552 of pixels of the second image 550 may be the set of second pixels if each pixel of the totality 552 of pixels of the second image 550 is visually related to the respective first pixel within the set 502 of first pixels.

In some embodiments, the server 112 may identify a set 504 of third pixels amongst the totality 506 of pixels of the first image 500. Each third pixel within the set 504 of third pixels may be visually unrelated to any pixel within the totality 552 of pixels of the second image 550. As mentioned above, the server 112 may determine the first mapping information between the first image 500 and the second image 550, which is depicted in FIG. 5 as M1.

In further embodiments, the server 112 may generate a reference image 580. Generating the reference image 580 may comprise assessing a resolution of the first image 500. For example, the server 112 may assess the resolution of the first image 500 as 8 pixels by 7 pixels. In this case, the server 112 may select the resolution of the reference image 580 to be equal to the resolution of the first image 500. It should be noted that, in this scenario, the server 112 selecting the resolution of the reference image 580 to be equal to the resolution of the first image 500 is illustrated for ease of explanation only.

In other embodiments, the server 112 may compute a second set of transposition factors that are indicative of a second mapping information between the first image 500 and the reference image 580. The second mapping information is depicted in FIG. 5 as M2.

The server 112 may compute each synthetic pixel within a set 582 of synthetic pixels based on the respective first pixel within the set 502 of first pixels correlated to the respective synthetic pixel within the set 582 of synthetic pixels and the respective second pixel within the set of second pixels correlated to the respective synthetic pixel within the set 582 of synthetic pixels. For example, the server 112 may compute a synthetic pixel 588 based on a first pixel 508 within the set 502 of first pixels correlated to the synthetic pixel 588 within the set 582 of synthetic pixels and based on a second pixel 558 within the set of second pixels correlated to the synthetic pixel 588 within the set 582 of synthetic pixels.

In alternative embodiments, the server 112 may compute the reference image 580 comprising a set 584 of first native pixels. The server 112 may compute each first native pixel within the set 584 of first native pixels based on a respective third pixel within the set 504 of third pixels correlated to a respective first native pixel. For example, the server 112 may compute a first native pixel 589 within the set 584 of first native pixels based on a third pixel 509 within the set 504 of third pixels correlated to the first native pixel 589. The server 112 may correlate the third pixel 509 to the first native pixel 589 via the second mapping information.

For example, the server 112 may compute the first native pixel 589 based on the third pixel 509 correlated to the first native pixel 589. Let's say that the server 112 is about to generate the first native pixel 589. The server 112 may identify a position of the first native pixel 589 as [6, 8]. Via the second mapping information, the server 112 may identify a position of the third pixel 509, which is correlated to the first native pixel 589, as [6, 8]. Via the first and the second mapping information, the server 112 may identify a position of a particular second pixel, which the server 112 may try to correlate to the first native pixel 589, as [6, 8]. However, as depicted in FIG. 5, the particular second pixel does not exist since the position of the particular second pixel [6, 8] does not exist within the second image 550. As a result, the server 112 may determine that the particular second pixel does not exist and that none of the pixels of the totality 552 of pixels of the second image 550 should be correlated, in this case, to the first native pixel 589. Therefore, none of the pixels of the totality 552 of pixels of the second image 550 may be correlated to the first native pixel 589.

The second mapping information may enable the server 112 to determine the positional relationship between the first pixel 508 and the synthetic pixel 588 and between the third pixel 509 and the first native pixel 589. For example, during the computation of the first native pixel 589, the server 112 may use the second mapping information to determine the positional relationship of the third pixel 509 within the set 504 of third pixels with the first native pixel 589. Further, during the computation of the first native pixel 589, the server 112 may use the second mapping information and the first mapping information to determine the positional relationship of the particular second pixel within the second image 550 with the first native pixel 589. However, as mentioned above, the positional relationship between the particular second pixel and the first native pixel 589 may not be determined since the particular second pixel does not exist within the second image 550.

In some embodiments, the server 112 may compute the first parameter and the second parameter. In this case, the first parameter may be at least partially indicative of the visual dissimilarity between the first pixels and the respective synthetic pixels and further at least partially indicative of the visual dissimilarity between the third pixels and the respective first native pixels. The second parameter may be at least partially indicative of the visual dissimilarity between the second pixels and the respective synthetic pixels.

Figure 10:
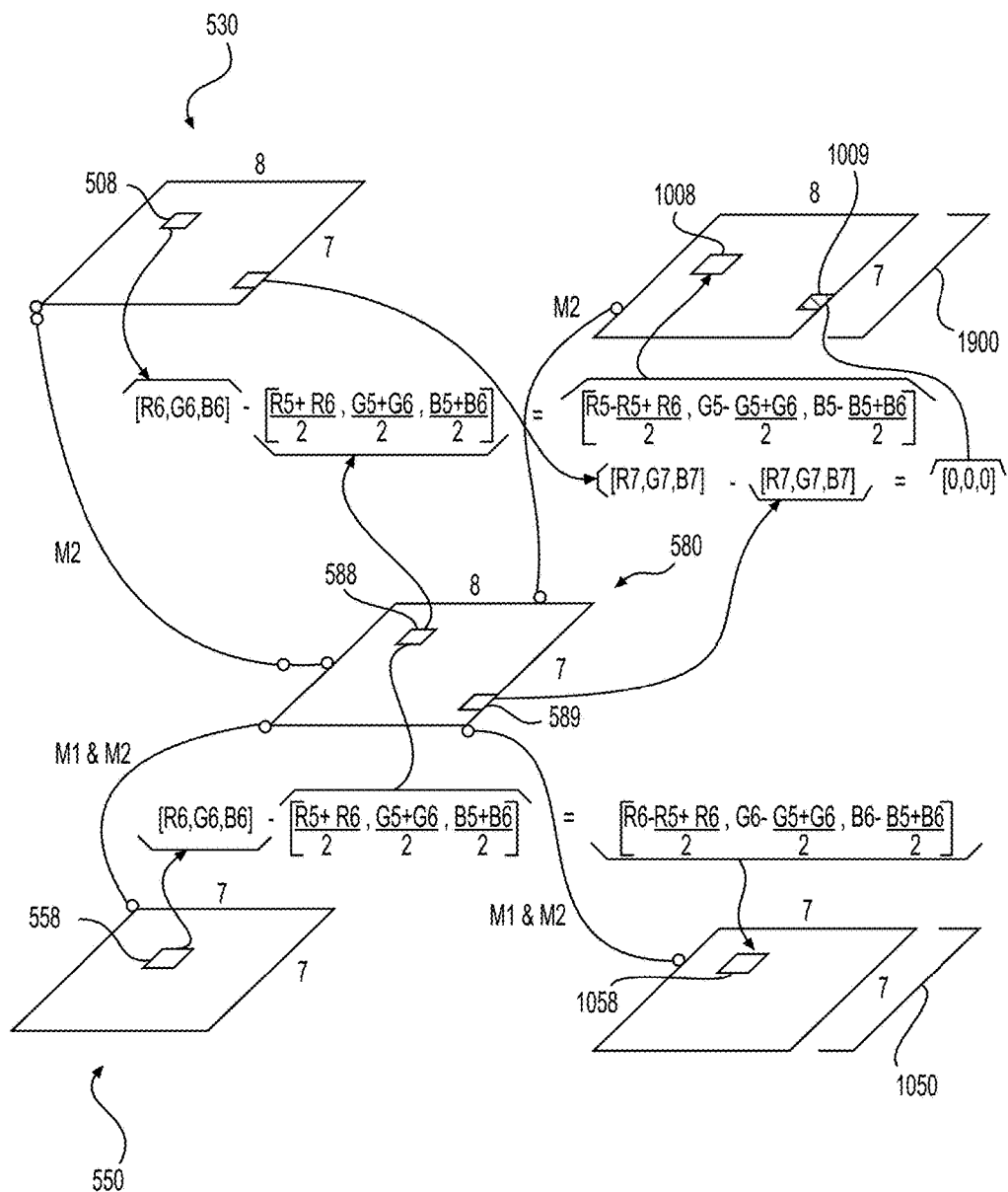
FIG. 10 illustrates the computation of a first and a second set of delta-pixels for a first and a second parameter, respectively, according to another embodiment of the present technology.

In this case, with reference to FIG. 10, a first delta-pixel 1008 within the set 1000 of first delta-pixels may be indicative of the visual dissimilarity between the first pixel 508 and the synthetic pixel 588. In other words, the first delta-pixel 1008 within the set 1000 of first delta-pixels may correspond to a difference between a set of color parameters corresponding to the first pixel 508 and a set of color parameter corresponding to the synthetic pixel 588.

Also, a second delta-pixel 1058 within the set 1050 of second delta-pixels may be indicative of the visual dissimilarity between the second pixel 558 and the synthetic pixel 588. In other words, the second delta-pixel 1058 within the set 1050 of second delta-pixels may correspond to the difference between a set of color parameters of the second pixel 558 and the set of color parameter of the synthetic pixel 588.

Let's say that the set of color parameters corresponding to the first pixel 508 is [R5, G5, B5] and that the set of color parameters corresponding to the second pixel 558 is [R6, G6, B6]. In some embodiments, the set of color parameters corresponding to the synthetic pixel 588 may be [(R5+R6)/2, (G5+G6)/2, (B5+B6)/2]. Therefore, the set of color parameters corresponding to the first delta-pixel 1008 may be [R5−(R5+R6)/2, G5−(G5+G6)/2, B5−(B5+B6)/2]. Furthermore, the set of color parameters corresponding to the second delta-pixel 1058 may be [R6−(R5+R6)/2, G6−(G5+G6)/2, B6−(B5+B6)/2].

In another example, a first delta-pixel 1009 within the set 1000 of first delta-pixels may be indicative of the visual dissimilarity between the third pixel 509 and the first native pixel 589. In other words, the first delta-pixel 1009 may correspond to a difference between a set of color parameters corresponding to the third pixel 509 and a set of color parameters corresponding to the first native pixel 589.

Let's say that the set of color parameters of the third pixel 509 is [R7, G7, B7]. In some embodiments, the set of color parameter of the first native pixel 589 may be [R7, G7, B7]. Therefore, the set of color parameters of the first delta-pixel 1009 may be [0, 0, 0] since the third pixel 509 and the first native pixel 589 are identical.

In some embodiments, the server 112 may be configured to store in the storage 114 the reference image 580, the first parameter and the second parameter. In alternative embodiments, the server 112 may be further configured to store in the storage 114 the first mapping information and the second mapping information.

In further embodiments, the server 112 may generate the first image 500 based on the first parameter, the second mapping information and the reference image 580. To this end, the server 112 may retrieve from the storage 114 the second mapping information, the reference image 580 and the first parameter. The server 112 may generate each first pixel of the first image 500 by adding the set of color parameters of the respectively correlated synthetic pixel within the reference image 580 with the set of color parameters of the respective first delta-pixel within the set 1000 of first delta-pixels. The server 112 may further generate each third pixel of the first image 500 by adding the set of color parameters of the respectively correlated synthetic pixel within the reference image 580 with the set of color parameters of the respective first delta-pixel within the set 1000 of first delta-pixels.

For example, the server 112 may determine the position of the first native pixel 589 within the reference image 580. Via the second mapping information, the server 112 may determine a position of the respective first delta-pixel 1009. The server 112 may add the set of color parameters corresponding to the first native pixel 589 to the set of color parameters corresponding to the first delta-pixel 1009 to determine the set of color parameters corresponding to the third pixel 509. Via the second mapping information, the server 112 may determine the position of the third pixel 509 within the first image 500 for generating the third pixel 509 at the position of the third pixel 509 within the first image 500.

Scenario 3: Reference Image Comprising Synthetic Pixels and First Native Pixels

Figure 6:
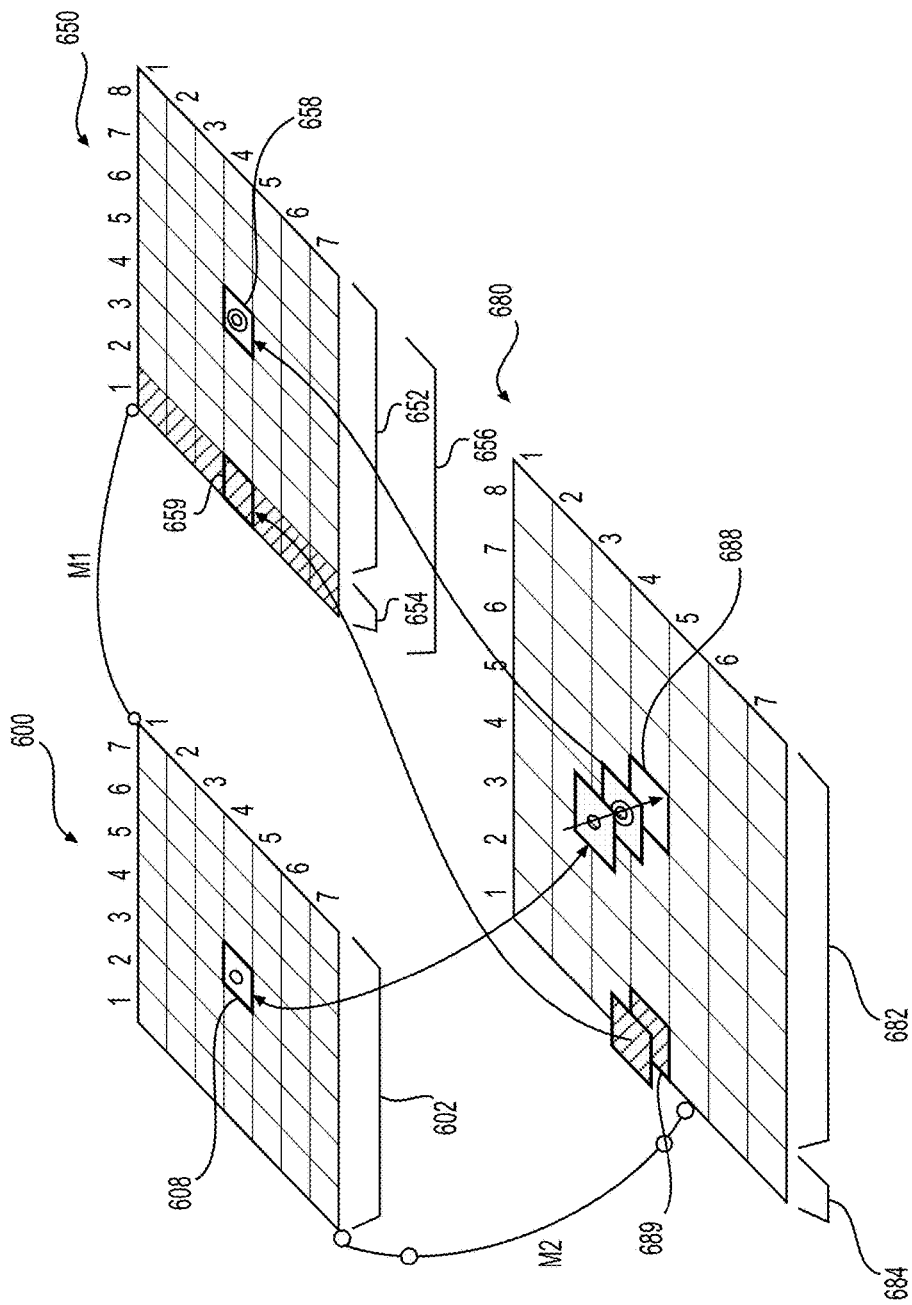
FIG. 6 illustrates the generation of another reference image according to an alternative embodiment of the present technology.

With reference to FIG. 6, there is depicted a first image 600 comprising a totality 602 of pixels of the first image 600 and a second image 650 comprising a totality 656 of pixels of the second image 650. Let's say that the server 112 determined that the first image 600 and the second image 650 are visually related. The server 112 may have identified a set 652 of second pixels amongst the totality 656 of pixels of the second image 650 wherein each second pixel is visually related to the respective first pixel within the totality 602 of pixels of the first image 600. In this case, the totality 602 of pixels of the first image 600 may be the set of first pixels if each pixel of the totality 602 of pixels of the first image 600 is visually related to the respective second pixel within the set 652 of second pixels.

In some embodiments, the server 112 may identify a set 654 of fourth pixels amongst the totality 656 of pixels of the second image 650. Each fourth pixel within the set 654 of fourth pixels may be visually unrelated to any pixel within the totality 602 of pixels of the first image 600. As mentioned above, the server 112 may determine the first mapping information between the first image 600 and the second image 650, which is depicted in FIG. 6 as M1.

In further embodiments, the server 112 may generate a reference image 680. Generating the reference image 680 may comprise assessing a resolution of the first image 600.

For example, the server 112 may assess the resolution of the first image 600 as 7 pixels by 7 pixels. The server 112 may also assess a resolution of the second image 650 as 7 pixels by 8 pixels. The server 112 may select the resolution of the reference image 680 to be equal to the resolution of the second image 650. It should be noted that, in this scenario, the server 112 selecting the resolution of the reference image 680 to be equal to the resolution of the second image 650 is illustrated for ease of explanation only.

In other embodiments, the server 112 may compute a second set of transposition factors that are indicative of a second mapping information between the first image 600 and the reference image 680. The second mapping information is depicted in FIG. 6 as M2.

The server 112 may compute each synthetic pixel within a set 682 of synthetic pixels based on the respective first pixel correlated to the respective synthetic pixel within the set 682 of synthetic pixels and the respective second pixel within the set 652 of second pixels correlated to the respective synthetic pixel within the set 682 of synthetic pixels. For example, the server 112 may compute a synthetic pixel 688 based on a first pixel 608 correlated to the synthetic pixel 688 within the set 682 of synthetic pixels and based on a second pixel 658 within the set 652 of second pixels correlated to the synthetic pixel 688 within the set 682 of synthetic pixels.

In alternative embodiments, the server 112 may compute the reference image 680 comprising a set 684 of second native pixels. The server 112 may compute each second native pixel within the set 684 of second native pixels based on a respective fourth pixel within the set 654 of fourth pixels correlated to the respective second native pixel. For example, the server 112 may compute a second native pixel 689 within the set 684 of second native pixels based on a fourth pixel 659 within the set 654 of fourth pixels correlated to the second native pixel 689. The server 112 may correlate the fourth pixel 659 to the second native pixel 689 via the first and the second mapping information.

For example, the server 112 may compute the second native pixel 689 based on the fourth pixel 659 within the set 654 of fourth pixels correlated to the second native pixel 689 within the set 684 of second native pixels. Let's say that the server 112 is about to generate the second native pixel 689. The server 112 may identify a position of the second native pixel 689 as [4, 1]. Via the first and the second mapping information, the server 112 may identify a position of the fourth pixel 659, which is correlated to the second native pixel 689, as [4, 1]. Via the first mapping information, the server 112 may identify a position of a particular first pixel, which the server 112 may try to correlate to the second native pixel 689, as [4, 0]. However, as depicted in FIG. 6, the particular first pixel does not exist since the position of the particular first pixel [4, 0] does not exist within the first image 600. As a result, the server 112 may determine that the particular first pixel does not exist and that none of the pixels of the totality 602 of pixels of the first image 600 should be correlated, in this case, to the second native pixel 689. Therefore, none of the pixels of the totality 602 of pixels of the first image 600 may be correlated to the second native pixel 689.

The second and the first mapping information may enable the server 112 to determine the positional relationship between the second pixel 658 and the synthetic pixel 688 and between the fourth pixel 659 and the second native pixel 689. For example, during the computation of the second native pixel 689, the server 112 may use the first and the second mapping information to determine the positional relationship of the fourth pixel 659 within the set 654 of fourth pixels with the second native pixel 689. Further, during the computation of the second native pixel 689, the server 112 may use the second mapping information to determine the positional relationship of the particular first pixel within the first image 600 with the second native pixel 689. However, as mentioned above, the positional relationship between the particular first pixel and the second native pixel 689 may not be determined since the particular first pixel does not exist within the first image 600.

In some embodiments, the server 112 may compute the first parameter and the second parameter. In this case, the first parameter may be at least partially indicative of the visual dissimilarity between the first pixels and the respective synthetic pixels. The second parameter may be at least partially indicative of the visual dissimilarity between the second pixels and the respective synthetic pixels and further at least partially indicative of the visual dissimilarity between the fourth pixels and the respective second native pixels.

Figure 11:
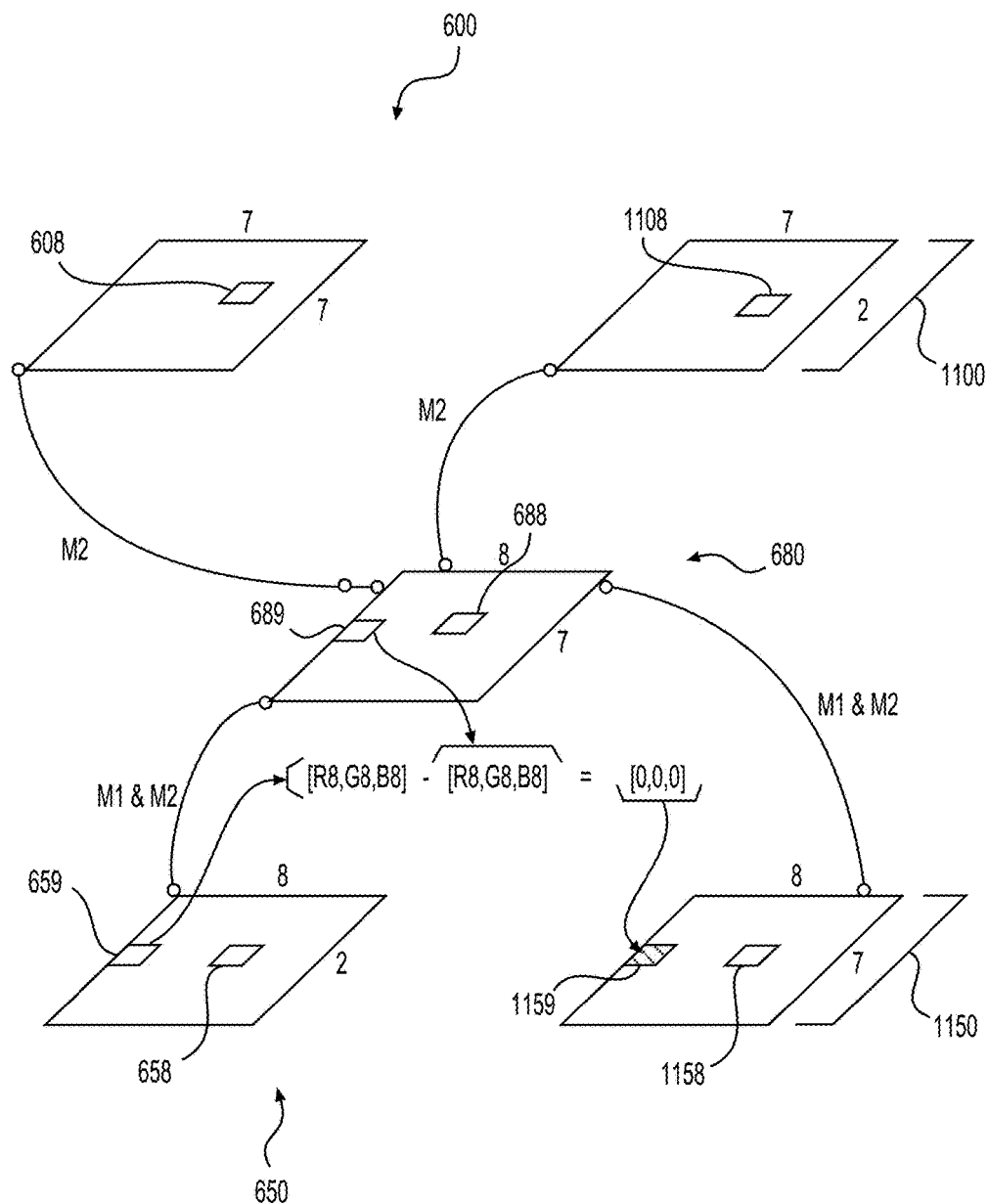
FIG. 11 illustrates the computation of a first and a second set of delta-pixels for a first and a second parameter, respectively, according to an alternative embodiment of the present technology.

In this case, with reference to FIG. 11, a first delta-pixel 1108 within the set 1100 of first delta-pixels may be indicative of the visual dissimilarity between the first pixel 608 and the synthetic pixel 688. In other words, the first delta-pixel 1108 within the set 1100 of first delta-pixels may correspond to a difference between a set of color parameters corresponding to the first pixel 608 and a set of color parameter corresponding to the synthetic pixel 688.

Moreover, a second delta-pixel 1158 within the set 1150 of second delta-pixels may be indicative of the visual dissimilarity between the second pixel 658 and the synthetic pixel 688. In other words, the second delta-pixel 1158 within the set 1150 of second delta-pixels may correspond to a difference between a set of color parameters corresponding to the second pixel 658 and a set of color parameters corresponding to the synthetic pixel 688.

In another example, a second delta-pixel 1159 within the set 1150 of second delta-pixels may be indicative of the visual dissimilarity between the fourth pixel 659 and the second native pixel 689. In other words, the second delta-pixel 1159 may correspond to a difference between a set of color parameters corresponding to the fourth pixel 659 and a set of color parameters corresponding to the second native pixel 689.

Let's say that the set of color parameters corresponding to the fourth pixel 659 is [R8, G8, B8]. In some embodiments, the set of color parameter corresponding to the second native pixel 689 may be [R8, G8, B8]. Therefore, the set of color parameters corresponding to the second delta-pixel 1159 may be [0, 0, 0] since the fourth pixel 659 and the second native pixel 689 are identical.

In some embodiments, the server 112 may be configured to store in the storage 114 the reference image 680, the first parameter and the second parameter. In alternative embodiments, the server 112 may be further configured to store in the storage 114 the first mapping information and the second mapping information.

In further embodiments, the server 112 may generate the second image 650 based on the second parameter, the first and the second mapping information and the reference image 680. To this end, the server 112 may retrieve from the storage 114 the first and the second mapping information, the reference image 680 and the second parameter. The server 112 may generate each second pixel of the second image 650 by adding the set of color parameters corresponding to the respectively correlated synthetic pixel within the reference image 680 with the set of color parameters corresponding to the respective second delta-pixel within the set 1150 of first delta-pixels. The server 112 may further generate each fourth pixel of the second image 650 by adding the set of color parameters corresponding to the respectively correlated second native pixel within the reference image 680 with the set of color parameters corresponding to the respective second delta-pixel within the set 1150 of second delta-pixels.

For example, the server 112 may determine the position of the second native pixel 689 within the reference image 680. Via the first and the second mapping information, the server 112 may determine a position of the respective second delta-pixel 1159. The server 112 may add the set of color parameters corresponding to the second native pixel 689 to the set of color parameters corresponding to the second delta-pixel 1159 to determine the set of color parameters corresponding to the fourth pixel 659. Via the first and the second mapping information, the server 112 may determine the position of the fourth pixel 659 within the second image 650 for generating the fourth pixel 659 at the position of the fourth pixel 659 within the second image 650.

Figure 7:
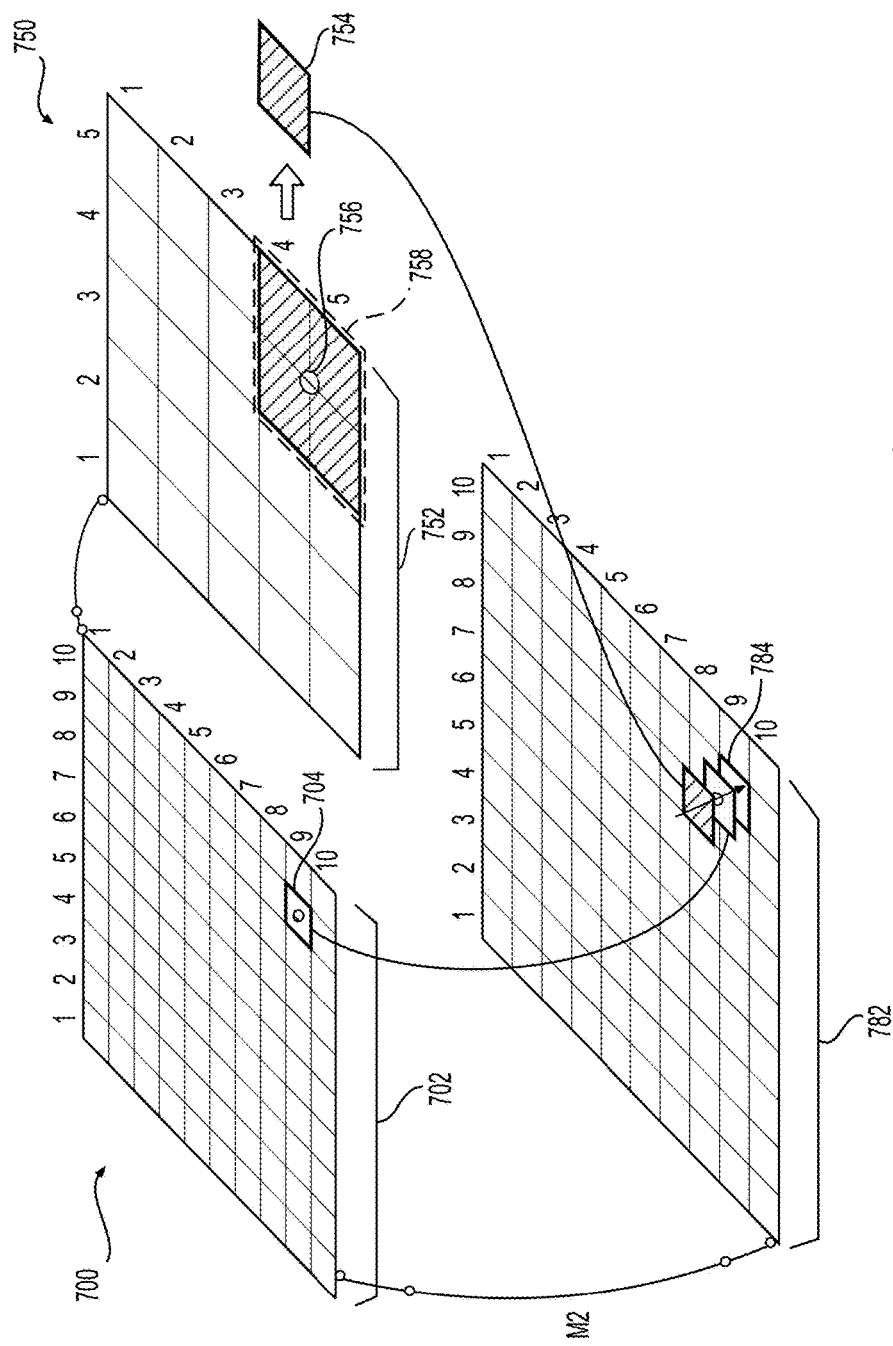
FIG. 7 illustrates the generation of a reference image according to some embodiment of the present technology.

Scenario 4: Reference Image Comprising Synthetic Pixels and a Distinctive Synthetic Pixel With reference to FIG. 7, there is depicted a first image 700 comprising a totality 702 of pixels of the first image 700 and a second image 750 comprising a totality 752 of pixels of the second image 750. Let's say that the server 112 determined that the first image 700 and the second image 750 are visually related. In other words, the server 112 may have determined that the second image 750 comprises second pixels (not numbered) being visually related to respective first pixels (not numbered) within the first image 700. As mentioned above, the server 112 may determine the first mapping information between the first image 700 and the second image 750, which is depicted in FIG. 7 as M1.

In one embodiment, the totality 702 of pixels of the first image 700 may comprise a distinctive pixel 704. In other embodiments, the totality 702 of pixels of the first image 700 may comprise a set (not depicted) of distinctive pixels. As it will be described below, positions of distinctive pixels within the totality 702 of pixels of the first image 700 may correlate to positions within the second image 750 that do not correspond to any pixel within the second image 750.

In some embodiments, the server 112 may generate a reference image 780. Generating the reference image 780 may comprise assessing a resolution of the first image 700. For example, the server 112 may assess the resolution of the first image 700 as 10 pixels by 10 pixels. The server 112 may assess a resolution of the second image 750 as 5 pixels by 5 pixels. The server 112 may select a resolution of the reference image 780. In this case, the server 112 may select the resolution of the reference image 780 to be equal to the resolution of the first image 700. It should be noted that, in this scenario, the server 112 selecting the resolution of the reference image 780 to be equal to the resolution of the first image 700 is illustrated for ease of explanation only.

In other embodiments, the server 112 may compute a second set of transposition factors that are indicative of a second mapping information between the first image 700 and the reference image 780. The second mapping information is depicted in FIG. 7 as M2.

In additional embodiments, the server 112 may compute the reference image 780 comprising the set 782 of synthetic pixels. In this case, computing each synthetic pixel within the set 782 of synthetic pixels may further comprise computing a distinctive synthetic pixel 784 based on the distinctive pixel 704 within the totality 702 of pixels of the first image 700 correlated to the distinctive synthetic pixel 784 and an interpolated pixel 754 correlated to the distinctive synthetic pixel 784. In some embodiments, computing the distinctive synthetic pixel 784 may comprise computing by the server 112 the interpolated pixel 754 based on an amalgamation 758 of pixels within the totality 752 of pixels of the second image 750.

For example, the server 112 may compute the distinctive synthetic pixel 784 based on the distinctive pixel 704 correlated to the synthetic pixel 784 within the set 782 of synthetic pixels and based on the interpolated pixel 754 correlated to the distinctive synthetic pixel 784. Let's say that the server 112 is about to generate the distinctive synthetic pixel 784. The server 112 may identify a position of the distinctive synthetic pixel 784 as [9, 9]. Via the second mapping information, the server 112 may identify a position of the distinctive pixel 704, which is correlated to the distinctive synthetic pixel 784, as [9, 9]. Via the first and the second mapping information, the server 112 may identify a position 756 within the second image 750, which is correlated to the distinctive synthetic pixel 784, as [4.5, 4.5].

However, none of the pixels of the totality 752 of pixels of the second image 750 corresponds to the position 756 even though the position 756 exists within the second image 750. In this case, the server 112 may determine the amalgamation 758 of pixels within the totality 752 of pixels of the second image 750 based on the first and the second mapping information. For example, the server 112 may determine the amalgamation 758 of pixels as being four nearest pixels to the position 756. It should be noted that any other number of nearest pixels to the position 756 may be determined by the server 112 as the amalgamation 758 of pixels in additional implementations of the present technology. The server 112 may compute the interpolated pixel 754 by executing an interpolation technique on pixels within the amalgamation 758 of pixels. For example, the server 112 may execute a nearest-neighbour interpolation, bilinear interpolation or bicubic interpolation on the pixels within the amalgamation 758 of pixels to compute the interpolated pixel 754. Other interpolation techniques may be contemplated in various implementations of the present technology. As a result, the interpolated pixel 754 may be correlated to the distinctive synthetic pixel 784.

In some embodiments of the present technology, computing the distinctive synthetic pixel 784 within the set 782 of synthetic pixels may further comprise averaging the distinctive pixel 704 correlated to the distinctive synthetic pixel 784 and the interpolated pixel 754 correlated to the distinctive synthetic pixel 784. For example, if the distinctive pixel 704 corresponds to a set of color parameters [R9, G9, B9] and the interpolated pixel 754 corresponds to a set of color parameters [R10, G10, B10], averaging the distinctive pixel 704 and the interpolated pixel 754 will result in the distinctive synthetic pixel 784 corresponding to a set of color parameters [(R9+R10)/2, (G9+G10)/2, (B9+B10)/2].

In some embodiments, the server 112 may compute the first parameter and the second parameter. The first parameter may be at least partially indicative of the visual dissimilarity between the first pixels and the respective synthetic pixels and may further be at least partially indicative of the visual dissimilarity between distinctive pixels within the first image 700 and the respective distinctive synthetic pixels within the reference image 780. The second parameter may be at least partially indicative of the visual dissimilarity between the second pixels within the second image 750 and the respective synthetic pixels within the reference image 780.

Figure 12:
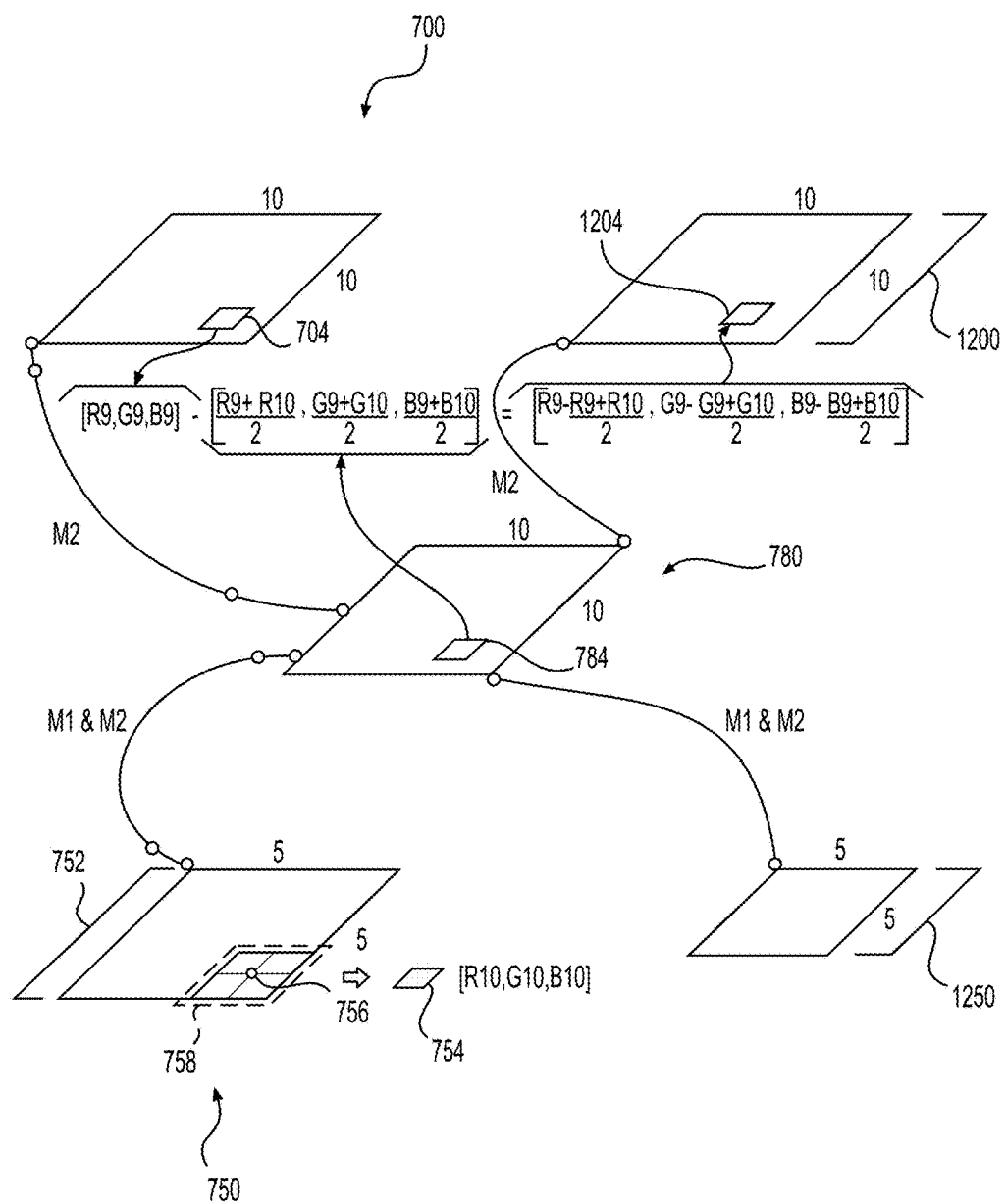
FIG. 12 illustrates the computation of a first and a second set of delta-pixels for a first and a second parameter, respectively, according to an embodiment of the present technology.

For example, with reference to FIG. 12, a first delta-pixel 1204 within the set 1200 of first delta-pixels being indicative of the visual dissimilarity between the distinctive pixel 704 and the distinctive synthetic pixel 784 may correspond to a set of color parameters [R9−(R9+R10)/2, G9−(G9+G10)/2, B9−(B9+B10)/2]. In other words, the first delta-pixel 1204 within the set 1200 of first delta-pixels may correspond to a difference between the set of color parameters corresponding to the distinctive pixel 704 and the set of color parameters corresponding to the distinctive synthetic pixel 784.

In another example, at least some second delta-pixels within a set 1250 of second delta-pixels may be indicative of the visual dissimilarity between the second pixels within the second image 750 and the respective synthetic pixels within the reference image 780.

In some embodiments, the server 112 may be configured to store in the storage 114 the reference image 780, the first parameter and the second parameter. In alternative embodiments, the server 112 may be further configured to store in the storage 114 the first mapping information and the second mapping information.

In further embodiments, the server 112 may generate the first image 700 based on the first parameter, the second mapping information and the reference image 780. To this end, the server 112 may retrieve from the storage 114 the second mapping information, the reference image 780 and the first parameter. The server 112 may generate each first pixel of the first image 700 by adding the set of color parameters of the respectively correlated synthetic pixel within the reference image 780 with the set of color parameters of the respective first delta-pixel within the set 1200 of first delta-pixels. The server 112 may further generate each distinctive pixel of the first image 700 by adding the set of color parameters of the respectively correlated distinctive synthetic pixel within the reference image 780 with the set of color parameters of the respective first delta-pixel within the set 1200 of first delta-pixels.

For example, the server 112 may determine the position of the distinctive synthetic pixel 784 within the reference image 780. Via the second mapping information, the server 112 may determine a position of the respective first delta-pixel 1204. The server 112 may add the set of color parameters corresponding to the distinctive synthetic pixel 784 with the set of color parameters corresponding to the first delta-pixel 1204 to determine the set of color parameters corresponding to the distinctive pixel 704. Via the second mapping information, the server 112 may determine the position of the distinctive pixel 704 within the first image 700 for generating the distinctive pixel 704 at the position of the distinctive pixel 704 within the first image 700.

Figure 8:
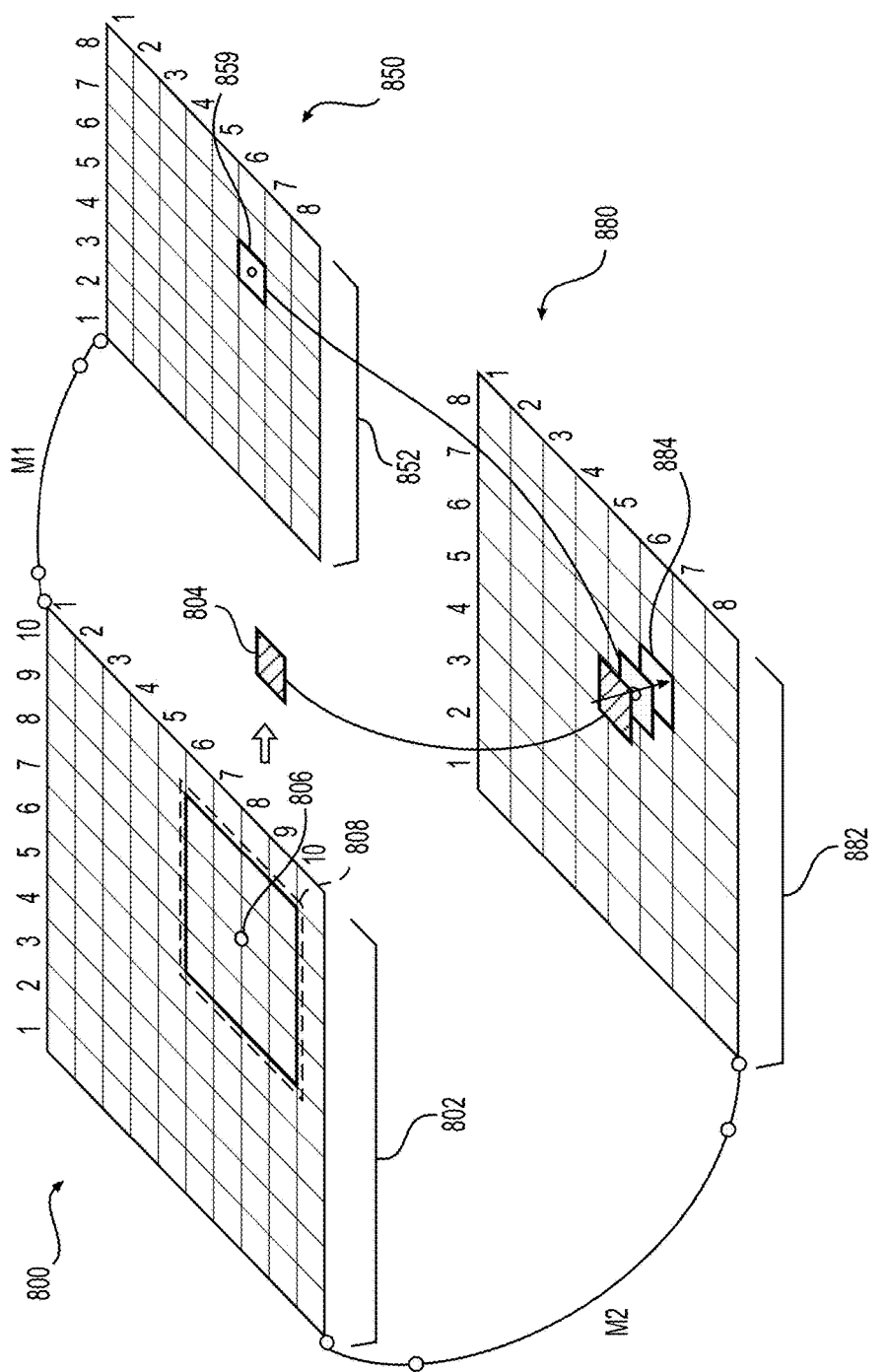
FIG. 8 illustrates the generation of a reference image according to an additional embodiment of the present technology.

Scenario 5: Reference Image Comprising Synthetic Pixels and the Distinctive Synthetic Pixel With reference to FIG. 8, there is depicted a first image 800 comprising a totality 802 of pixels of the first image 800 and a second image 850 comprising a totality 852 of pixels of the second image 850. Let's say that the server 112 determined that the first image 800 and the second image 850 are visually related. In other words, the server 112 may have determined first pixels (not numbered) within the first image 800 being visually related to respective second pixels (not numbered) within the second image 850. As mentioned above, the server 112 may determine the first mapping information between the first image 800 and the second image 850, which is depicted in FIG. 8 as M1.

In one embodiment, the totality 852 of pixels of the second image 850 may comprise a distinctive pixel 854. In other embodiments, the totality 852 of pixels of the second image 850 may comprise a set (not depicted) of distinctive pixels. As it will be described below, positions of distinctive pixels within the totality 852 of pixels of the second image 850 may correlate to positions within the first image 800 that do not correspond to any pixel within the first image 800.

In some embodiments, the server 112 may generate a reference image 880. Generating the reference image 880 may comprise assessing a resolution of the first image 800. For instance, the server 112 may assess the resolution of the first image 800 as 10 pixels by 10 pixels. The server 112 may assess a resolution of the second image 850 as 8 pixels by 8 pixels, for example. The server 112 may select a resolution of the reference image 880. In this case, the server 112 may select the resolution of the reference image 880 to be equal to the resolution of the second image 850. It should be noted that, in this scenario, the server 112 selecting the resolution of the reference image 880 to be equal to the resolution of the second image 850 is illustrated for ease of explanation only.

In other embodiments, the server 112 may compute a second set of transposition factors that are indicative of a second mapping information between the first image 800 and the reference image 880. The second mapping information is depicted in FIG. 8 as M2.

In additional embodiments, the server 112 may compute the reference image 880 comprising the set 882 of synthetic pixels. In this case, computing each synthetic pixel within the set 882 of synthetic pixels may further comprise computing a distinctive synthetic pixel 884 based on the distinctive pixel 854 within the totality 852 of pixels of the second image 850 correlated to the distinctive synthetic pixel 884 and an interpolated pixel 804 correlated to the distinctive synthetic pixel 884. In some embodiments, computing the distinctive synthetic pixel 884 may comprise computing by the server 112 the interpolated pixel 804 based on the amalgamation 808 of pixels within the totality 802 of pixels of the first image 800.

For example, the server 112 may compute the distinctive synthetic pixel 884 based on the distinctive pixel 854 correlated to the synthetic pixel 884 within the set 882 of synthetic pixels and based on the interpolated pixel 804 correlated to the distinctive synthetic pixel 884. Let's say that the server 112 is about to generate the distinctive synthetic pixel 884. The server 112 may identify a position of the distinctive synthetic pixel 884 as [6, 6]. Via the first and second mapping information, the server 112 may identify a position of the distinctive pixel 854, which is correlated to the distinctive synthetic pixel 884, as [6, 6]. Via the second mapping information, the server 112 may identify a position 806 within the first image 800, which is correlated to the distinctive synthetic pixel 884, as [4.5, 4.5].

However, none of the pixels of the totality 802 of pixels of the first image 800 corresponds to the position 806 even though the position 806 exists within the first image 800. In this case, the server 112 may determine the amalgamation 808 of pixels within the totality 802 of pixels of the first image 800 based on the second mapping information. For example, the server 112 may determine the amalgamation 808 of pixels as being sixteen nearest pixels to the position 806. It should be noted that any other number of nearest pixels to the position 806 may be determined by the server 112 as the amalgamation 808 of pixels in additional implementations of the present technology. The server 112 may compute the interpolated pixel 804 by executing the interpolation technique on pixels within the amalgamation 808 of pixels. As a result, the interpolated pixel 804 may be correlated to the distinctive synthetic pixel 884.

In some embodiments of the present technology, computing the distinctive synthetic pixel 884 within the set 882 of synthetic pixels may further comprise averaging the distinctive pixel 854 correlated to the distinctive synthetic pixel 884 and the interpolated pixel 804 correlated to the distinctive synthetic pixel 884. For example, if the distinctive pixel 854 corresponds to a set of color parameters [R11, G11, B11] and the interpolated pixel 804 corresponds to a set of color parameters [R12, G12, B12], averaging the distinctive pixel 854 and the interpolated pixel 804 may result in the distinctive synthetic pixel 884 corresponding to a set of color parameters [(R11+R12)/2, (G11+G12)/2, (B11+B12)/2].

In some embodiments, the server 112 may compute the first parameter and the second parameter. The first parameter may be at least partially indicative of the visual dissimilarity between the first pixels within the first image 800 and the respective synthetic pixels within the reference image 880. The second parameter may be at least partially indicative of the visual dissimilarity between the second pixels within the second image 850 and the respective synthetic pixels within the reference image 880 and may further be at least partially indicative of the visual dissimilarity between distinctive pixels within the second image 850 and the respective distinctive synthetic pixels within the reference image 880.

For example, a second delta-pixel 1354 within a set 1350 of second delta-pixels being indicative of the visual dissimilarity between the distinctive pixel 854 and the distinctive synthetic pixel 884 may correspond to a set of color parameters [R11−(R11+R12)/2, G11−(G11+G12)/2, B11−(B11+B12)/2]. In other words, the second delta-pixel 1354 within the set 1350 of second delta-pixels may correspond to a difference between the set of color parameters corresponding to the distinctive pixel 854 and the set of color parameters corresponding to the distinctive synthetic pixel 884.

In some embodiments, the server 112 may be configured to store in the storage 114 the reference image 880, the first parameter and the second parameter. In alternative embodiments, the server 112 may be further configured to store in the storage 114 the first mapping information and the second mapping information.

In further embodiments, the server 112 may generate the second image 850 based on the second parameter, the first and the second mapping information and the reference image 880. To this end, the server 112 may retrieve from the storage 114 the first and the second mapping information, the reference image 880 and the second parameter. The server 112 may generate each second pixel of the second image 850 by adding the set of color parameters corresponding to the respectively correlated synthetic pixel within the reference image 880 with the set of color parameters corresponding to the respective first delta-pixel within the set 1350 of second delta-pixels. The server 112 may further generate each distinctive pixel of the second image 850 by adding the set of color parameters corresponding to the respectively correlated distinctive synthetic pixel within the reference image 880 with the set of color parameters corresponding to the respective second delta-pixel 1354 within the set 1350 of second delta-pixels.

For example, the server 112 may determine the position of the distinctive synthetic pixel 884 within the reference image 880. Via the first and the second mapping information, the server 112 may determine a position of the respective second delta-pixel 1354. The server 112 may add the set of color parameters corresponding to the distinctive synthetic pixel 884 with the set of color parameters corresponding to the second delta-pixel 1354 to determine the set of color parameters corresponding to the distinctive pixel 854. Via the first and the second mapping information, the server 112 may determine the position of the distinctive pixel 854 within the second image 850 for generating the distinctive pixel 854 at the position of the distinctive pixel 854 within the second image 850.

Figure 14:
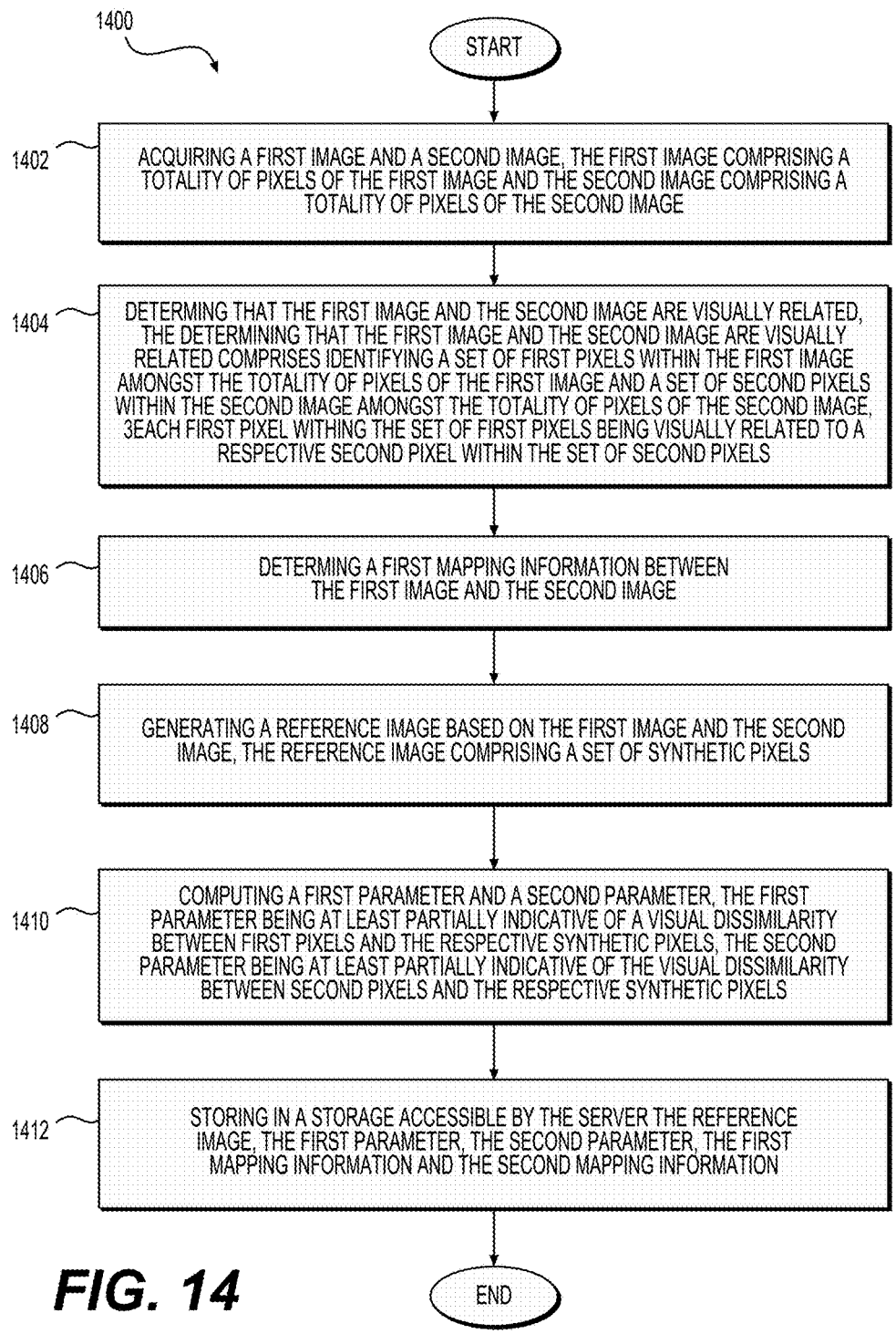
FIG. 14 is a flowchart of a method of processing and storing visually related images according to an implementation of the present technology.

With reference to FIG. 14, there is depicted a flow chart of a method 1400 that may be executed by the server 112 in some embodiments of the present technology.

Step 1402: Acquiring a First Image and a Second Image

The method 1400 begins at step 1402 with the server 112 acquiring the first image 400 and the second image 450, the first image 400 comprising the totality 402 of pixels of the first image 400 and the second image 450 comprising the totality 452 of pixels of the second image 450, as depicted in FIG. 4.

As mentioned above, the first image 400 and the second image 450 may be received by the server 112 via the data packet 107 and/or the data packet 108 from the public information sources 130 and/or the electronic device 104, respectively.

Step 1404: Determining that the First Image and the Second Image are Visually Related The method 1400 continues to step 1404 with the server 112 determining that the first image 400 and the second image 450 are visually related, as depicted in FIG. 4. Determining that the first image 400 and the second image 450 are visually related comprises identifying the set of first pixels within the first image 400 amongst the totality 402 of pixels of the first image 400 and the set of second pixels within the second image 450 amongst the totality 452 of pixels of the second image 450, wherein each first pixel within the set of first pixels being visually related to the respective second pixel within the set of second pixels.

In some embodiments, with reference to FIG. 5, the server 112 may identify the set 504 of third pixels amongst the totality 506 of pixels of the first image 500, wherein each third pixel within the set 504 of third pixels being visually unrelated to any pixel within the totality 552 of pixels of the second image 550.

In other embodiments, with reference to FIG. 6, the server 112 may identify the set 654 of fourth pixels amongst the totality 656 of pixels of the second image 650, wherein each fourth pixel within the set 654 of fourth pixels being visually unrelated to any pixel within the totality 602 of pixels of the first image 600.

Step 1406: Determining a First Mapping Information

The method 1400 continues to step 1406 with the server 112 determining the first mapping information (i.e., equation 1) between the first image 400 and the second image 450, as depicted in FIG. 4.

In some embodiments, with reference to FIG. 3, determining the first mapping information may comprise selecting the at least two first pixels 304 within the first image 300. The server 112 may identify the positions [x1, y1] [x2, y2] of the at least two first pixels 304 within the first image 300 and the positions [x3, y3] [x4, y4] of the respective visually related second pixels 354 within the second image 350. The server 112 may compute the first set of transposition factors (see Kx, Ky, Dx and Dy in equation 1) based on the positions [x1, y1] [x2, y2] of the at least two first pixels 304 within the first image 300 and the positions [x3, y3] [x4, y4] of the respective visually related second pixels 354 within the second image 350, the first set of transposition factors being indicative of the first mapping information between the first image 300 and the second image 350.

Step 1408: Generating a Reference Image Based on the First Image and the Second Image The method 1400 continues to step 1408 with the server 112 generating the reference image 480 based on the first image 400 and the second image 450, the reference image comprising the set 482 of synthetic pixels, as depicted in FIG. 4. Generating the reference image 480 may comprise determining the second mapping information (i.e., depicted as M2 in FIG. 4) between the first image 400 and the reference image 480. Generating the reference image 480 may comprise computing each synthetic pixel within the set 482 of synthetic pixels based on the respective first pixel (e.g., the first pixel 404) within the set of first pixels correlated to the respective synthetic pixel (e.g., the synthetic pixel 484) within the set 482 of synthetic pixels and the respective second pixel (e.g., the second pixel 454) within the set of second pixels correlated to the respective synthetic pixel (e.g., the synthetic pixel 484) within the set 482 of synthetic pixels. Computing each synthetic pixel comprises correlating the respective first pixel (e.g., the first pixel 404) to the respective synthetic pixel (e.g., the synthetic pixel 484) via the second mapping information and the respective second pixel (e.g., the second pixel 454) to the respective synthetic pixel (e.g., the synthetic pixel 484) via the first and the second mapping information.

In some embodiments, generating the reference image 480 may further comprise assessing the resolution of the first image 400, selecting the resolution of the reference image 480 and computing the second set of transposition factors being indicative of the second mapping information, being depicted as M2 in FIG. 4, between the first image 400 and the reference image 480 based on the resolution of the reference image 480 and the resolution of the first image 400.

In other embodiments, with reference to FIG. 5, the reference image 580 may further comprise the set 584 of first native pixels. In this case, generating the reference image 580 may further comprise computing each first native pixel within the set 584 of first native pixels based on the respective third pixel (e.g., the third pixel 509) within the set 504 of third pixels correlated to the respective first native pixel (e.g., the first native pixel 589). Computing each first native pixel may comprise correlating the respective third pixel (e.g., the third pixel 509) to the respective first native pixel (e.g., the first native pixel 589) via the second mapping information.

In additional embodiments, with reference to FIG. 6, the reference image 680 may further comprise the set 654 of second native pixels. In this case, generating the reference image 680 may further comprise computing each second native pixel within the set 684 of second native pixels based on the respective fourth pixel (e.g., the fourth pixel 659) within the set 654 of fourth pixels correlated to the respective second native pixel (e.g., the second native pixel 689). Computing each second native pixel comprises correlating the respective fourth pixel (e.g., the fourth pixel 659) to the respective second native pixel (e.g., the second native pixel 689) via the first and the second mapping information.

In alternative embodiments, with reference to FIG. 7, computing each synthetic pixel within the set 782 of synthetic pixels may further comprise computing the distinctive synthetic pixel 784 based on the distinctive pixel 704 correlated to the distinctive synthetic pixel 784 and the interpolated pixel 754 correlated to the distinctive synthetic pixel 784. In this case, computing the distinctive synthetic pixel 784 may comprise computing the interpolated pixel 754 based on the amalgamation 758 of pixels within the totality 752 of pixels of the second image 750.

In some embodiments, computing the distinctive synthetic pixel 784 may further comprise correlating the distinctive pixel 704 to the distinctive synthetic pixel 784 via the second mapping information (depicted as M2 in FIG. 7) and correlating the interpolated pixel 754 to the distinctive synthetic pixel 784 via the first (depicted as M1 in FIG. 7) and the second mapping information.

In other embodiments, computing the interpolated pixel 754 may comprise determining the amalgamation 758 of pixels within the totality 752 of pixels of the second image 750 based on the first and the second mapping information.

In further embodiments, with reference to FIG. 4, computing each synthetic pixel within the set 482 of synthetic pixels may further comprise averaging the first pixel (e.g., the first pixel 404) correlated to the respective synthetic pixel (e.g., the synthetic pixel 484) and the second pixel (e.g., the second pixel 454) correlated to the respective synthetic pixel (e.g., the synthetic pixel 484).

In additional embodiments, with reference to FIG. 7, computing the distinctive synthetic pixel 784 may further comprise averaging the distinctive pixel 704 correlated to the distinctive synthetic pixel 784 and the interpolated pixel 754 correlated to the distinctive synthetic pixel 784.

In alternative embodiments, with reference to FIG. 8, computing each synthetic pixel within the set 882 of synthetic pixels may further comprise computing the distinctive synthetic pixel 884 based on the distinctive pixel 854 correlated to the distinctive synthetic pixel 884 and the interpolated pixel 804 correlated to the distinctive synthetic pixel 884. In this case, computing the distinctive synthetic pixel 884 may comprise computing the interpolated pixel 804 based on the amalgamation 808 of pixels within the totality 802 of pixels of the first image 800.

In some embodiments, computing the distinctive synthetic pixel 884 may further comprise correlating the distinctive pixel 854 to the distinctive synthetic pixel 884 via the first and the second mapping information and correlating the interpolated pixel 804 to the distinctive synthetic pixel 884 via the second mapping information.

In other embodiments, computing the interpolated pixel 804 may comprise determining the amalgamation 808 of pixels within the totality 802 of pixels of the first image 800 based on the second mapping information.

In additional embodiments, computing the distinctive synthetic pixel 884 may further comprise averaging the distinctive pixel 854 correlated to the distinctive synthetic pixel 884 and the interpolated pixel 804 correlated to the distinctive synthetic pixel 884.

Step 1410: Computing a First Parameter and a Second Parameter

The method 1400 continues to step 1410 with the server 112 computing the first parameter and the second parameter, wherein the first parameter may be at least partially indicative of the visual dissimilarity between the first pixels and the respective synthetic pixels, and wherein the second parameter may be at least partially indicative of the visual dissimilarity between the second pixels and the respective synthetic pixels.

In some embodiments, the first parameter may further be at least partially indicative of the visual dissimilarity between the third pixels and the respective first native pixels. In other embodiments, wherein the second parameter may further be at least partially indicative of the visual dissimilarity between the fourth pixels and the respective second native pixels.

In further embodiments, the first parameter may further be at least partially indicative of the visual dissimilarity between the distinctive pixels within the first image and the respective distinctive synthetic pixels within the reference image. In other embodiments, wherein the second parameter may further be at least partially indicative of the visual dissimilarity between the distinctive pixels within the second image and the respective distinctive synthetic pixels within the reference image.

In additional embodiments, with reference to FIG. 9, the first and the second parameter may comprise the set 900 of first delta-pixels and the set 950 of second delta-pixels, respectively, and the indication of the resolution of the first image 400 and the second image 450, respectively. The first delta-pixels within the set 900 of first delta-pixels may be at least partially indicative of the visual dissimilarity between the first pixels and the respective synthetic pixels and the second delta-pixels within the set 950 of second delta-pixels may be at least partially indicative of the visual dissimilarity between the second pixels and the respective synthetic pixels.

In another embodiment, with reference to FIG. 10, the first and the second parameter may comprise the set 1000 of first delta-pixels and the set 1050 of second delta-pixels, respectively, and the indication of the resolution of the first image 500 and the second image 550, respectively. The first delta-pixels within the set 1000 of first delta-pixels may be at least partially indicative of the visual dissimilarity between the first pixels within the image 500 and the respective synthetic pixels within the reference image 580 and may further be at least partially indicative of the visual dissimilarity between the third pixels within the first image 500 and the respective first native pixels within the reference image 580. The second delta-pixels within the set 1050 of second delta-pixels may be at least partially indicative of the visual dissimilarity between the second pixels within the second image 550 and the respective synthetic pixels within the reference image 580.

In alternative embodiments, with reference to FIG. 11, the first and the second parameter may comprise the set 1100 of first delta-pixels and the set 1150 of second delta-pixels, respectively, and the indication of the resolution of the first image 600 and the second image 650, respectively. The first delta-pixels within the set 1100 of first delta-pixels may be at least partially indicative of the visual dissimilarity between the first pixels within the image 600 and the respective synthetic pixels within the reference image 680. The second delta-pixels within the set 1150 of second delta-pixels may be at least partially indicative of the visual dissimilarity between the second pixels within the second image 650 and the respective synthetic pixels within the reference image 680 and may further be at least partially indicative of the visual dissimilarity between the fourth pixels within the second image 650 and the respective second native pixels within the reference image 680.

In further embodiment, with reference to FIG. 12, the first and the second parameter may comprise the set 1200 of first delta-pixels and the set 1250 of second delta-pixels, respectively, and the indication of the resolution of the first image 700 and the second image 750, respectively. The first delta-pixels within the set 1200 of first delta-pixels may be at least partially indicative of the visual dissimilarity between the first pixels within the image 700 and the respective synthetic pixels within the reference image 780 and may further be at least partially indicative of the visual dissimilarity between the distinctive pixel 707 within the first image 700 and the respective distinctive synthetic pixel 784 within the reference image 780. The second delta-pixels within the set 1250 of second delta-pixels may be at least partially indicative of the visual dissimilarity between the second pixels within the second image 750 and the respective synthetic pixels within the reference image 780.

Figure 13:
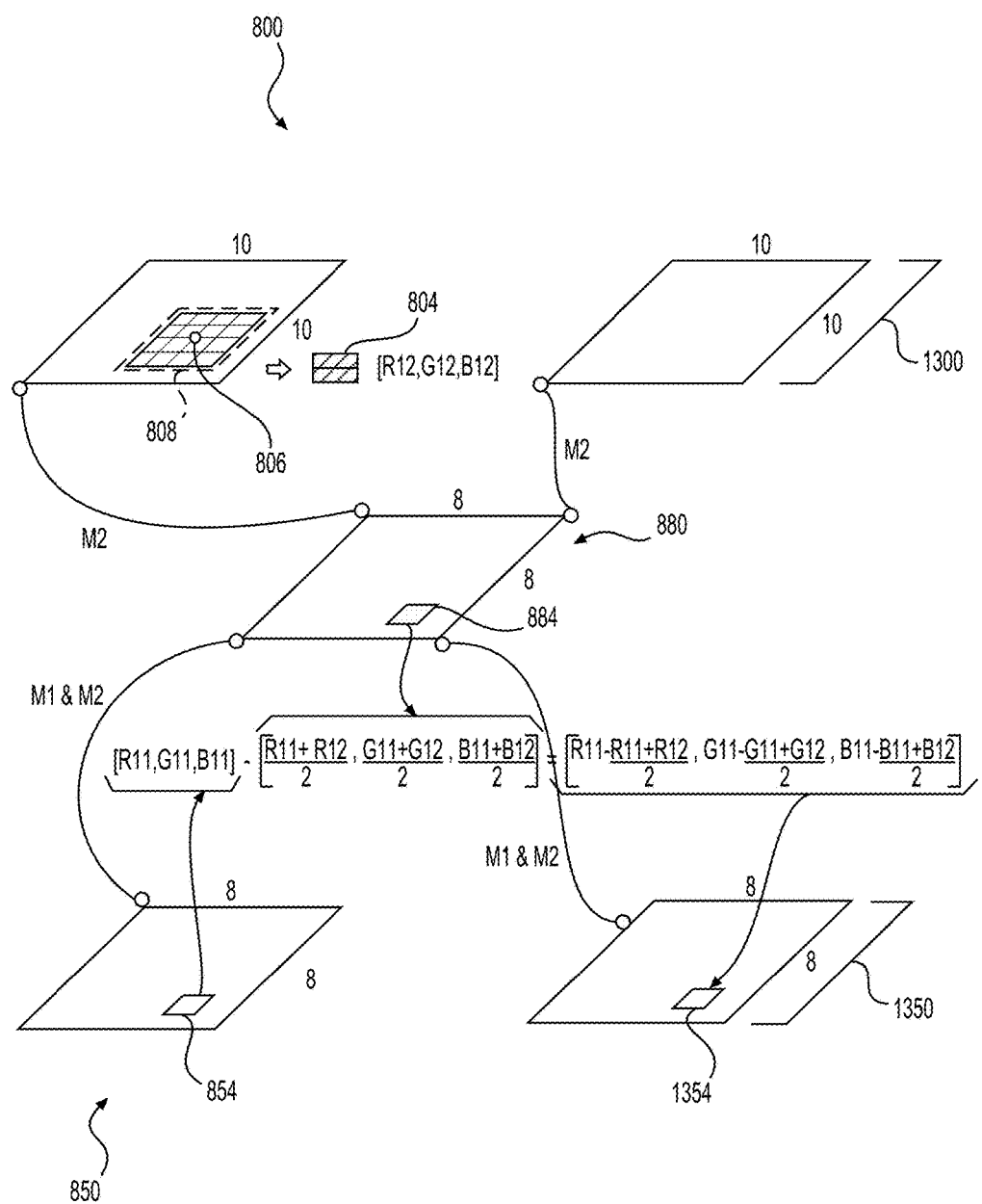
FIG. 13 illustrates the computation of a first and a second set of delta-pixels for a first and a second parameter, respectively, according to an additional embodiment of the present technology.

In yet another embodiment, with reference to FIG. 13, the first and the second parameter may comprise a set 1300 of first delta-pixels and the set 1350 of second delta-pixels, respectively, and the indication of the resolution of the first image 800 and the second image 850, respectively. The first delta-pixels within the set 1300 of first delta-pixels may be at least partially indicative of the visual dissimilarity between the first pixels within the image 800 and the respective synthetic pixels within the reference image 880. The second delta-pixels within the set 1350 of second delta-pixels may be at least partially indicative of the visual dissimilarity between the second pixels within the second image 850 and the respective synthetic pixels within the reference image 880 and may further be at least partially indicative of the visual dissimilarity between the distinctive pixel 854 within the second image 850 and the respective distinctive synthetic pixel 884 within the reference image 880.

In further embodiments, the first parameter may further comprise the second mapping information and the second parameter may further comprise the first and the second mapping information.

Step 1412: Storing the Reference Image, the First Parameter, the Second Parameter The method 1400 ends at step 1412 with the server 112 storing in the storage 114 the reference image 480, the first parameter, the second parameter, the first mapping information and the second mapping information.

In some embodiments, as mentioned above, the first parameter may comprise the second mapping information and the second parameter may comprise the first and the second mapping information. The method 1400 may then end.

It should be noted that some embodiments of the present technology may allow reducing the storage requirements for storing the visually related images. More specifically, implementations of the present technology, by creating the reference image and the difference information allows reducing the storage space required to store the totality of visually related images.

Figure 15:
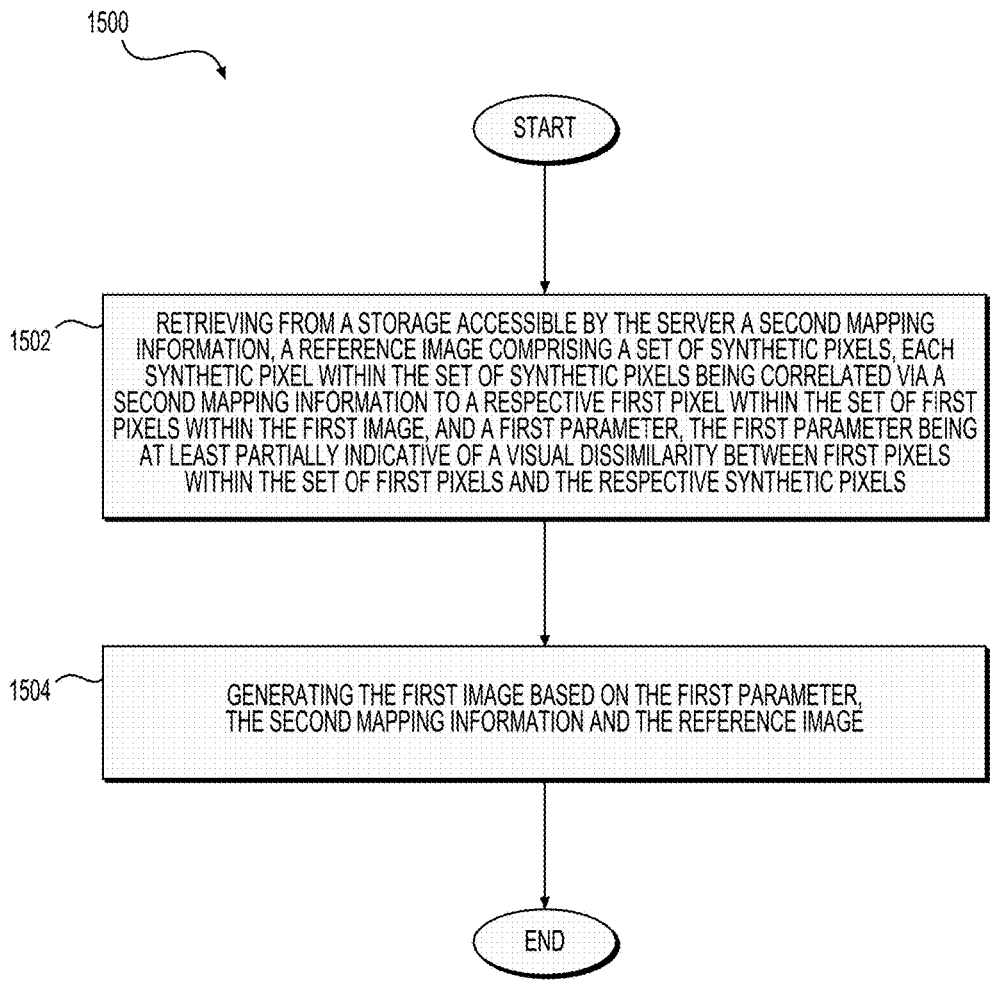
FIG. 15 is a flowchart of a method of generating a first images according to an implementation of the present technology.

With reference to FIG. 15, there is depicted a flow chart of a method 1500 that may be executed by the server 112 in some embodiments of the present technology.

Step 1502: Retrieving from a Storage Accessible by the Server a Second Mapping Information, a Reference Image and a First Parameter The method 1500 begins at step 1502 by the server 112 retrieving from the storage 114 the second mapping information, the reference image 480 comprising the set 482 of synthetic pixels, wherein each synthetic pixel within the set 482 of synthetic pixels may be correlated via the second mapping information to the respective first pixel within the set of first pixels within the first image 400 and the first parameter, wherein the first parameter may be at least partially indicative of the visual dissimilarity between first pixels within the set of first pixels and the respective synthetic pixels, as depicted in FIG. 4.

In other embodiments, wherein each synthetic pixel within the set 482 of synthetic pixels is further correlated via the first mapping information and the second mapping information to the respective second pixel within the set of second pixels within the second image 450, the server 112 may retrieve the first mapping information and the second parameter, wherein the second parameter may be at least partially indicative of the visual dissimilarity between second pixels within the set of second pixels and the respective synthetic pixels.

Step 1502: Generating the First Image

The method 1500 continues to step 1502 with the server 112 generating the first image 400 based on the first parameter, the second mapping information and the reference image 480, as depicted in FIG. 4.

In other embodiments, the server 112 may generate the second image 450 based on the second parameter, the second mapping information, the first mapping information and the reference image 480.

In some embodiments, wherein the reference image 580 further comprises the set 584 of first native pixels, where each first native pixel within the set 584 of first native pixels may be correlated via the second mapping information to the respective third pixel within the set 504 of third pixels of the first image 500 and wherein the first parameter is further at least partially indicative of the visual dissimilarity between the third pixels and the respective first native pixels, as depicted in FIG. 5, the server 112 may generate the first image 500 comprising the set 504 of third pixels.

In additional embodiments, wherein the reference image 680 further comprises the set 684 of second native pixels, where each second native pixel within the set 684 of second native pixels may be correlated via the first and the second mapping information to the respective fourth pixel within the set 654 of third pixels of the second image 650 and wherein the second parameter is further at least partially indicative of the visual dissimilarity between the fourth pixels and the respective second native pixels, as depicted in FIG. 6, the server 112 may generate the second image 650 further comprising the set 654 of fourth pixels.

In further embodiments, wherein the set 782 of synthetic pixels further comprises the distinctive synthetic pixel 784 correlated via the second mapping information to the distinctive pixel 704 within the first image 700 and wherein the first parameter is further at least partially indicative of the visual dissimilarity between the distinctive pixel 704 within the first image 700 and the distinctive synthetic pixel 784, as depicted in FIG. 7, the server 112 may generate the first image 700 further comprising the distinctive pixel 704.

In alternative embodiments, wherein the set 882 of synthetic pixels further comprises the distinctive synthetic pixel 884 correlated via the first and the second mapping information to the distinctive pixel 854 within the second image 850 and wherein the second parameter is further at least partially indicative of the visual dissimilarity between the distinctive pixel 854 within the second image 850 and the distinctive synthetic pixel 884, the server 112 may generate the second image 850 further comprising the distinctive pixel 704.

In yet another embodiment, the server 112 may send instructions to the electronic device 104 for displaying the first image 400 and the second image 450 to the user 102. For example, the server 112 may generate a data packet 180 depicted in FIG. 1 comprising the instructions for generating the first 400 and the second 450 image and may send the data packet 180 to the electronic device 104 via the communication network 110.

The method 1500 then ends.

In some implementations of the present technology, the server 112 executing the method 1400 may reduce the necessary storage requirements for storing various visually related images. In some instances, the server 112 executing the method 1400 may reduce the necessary storage requirements for storing a video since multiple video frames within a video may be visually related to one another. In other implementations of the present technology, the server 112 further executing the method 1500 may enable retrieving the various visually related images from a database or a storage with limited storage capacity.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

One skilled in the art will appreciate when the instant description refers to "receiving data" from a user that the electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

As such, from one perspective, embodiments of the present technology described above can be summarized as follows, structured in numbered clauses.

CLAUSE 1. A method (1400) of processing and storing images, the method (1400) being executed by a server (112), the method (1400) comprising:
acquiring (1402), by the server (112), a first image (400) and a second image (450), the first image (400) comprising a totality (402) of pixels of the first image (400) and the second image (450) comprising a totality (452) of pixels of the second image (450);
determining (1404), by the server (112), that the first image (400) and the second image (450) are visually related, the determining that the first image (400) and the second image (450) are visually related comprises identifying, by the server (112), a set of first pixels within the first image (400) amongst the totality (402) of pixels of the first image (400) and a set of second pixels within the second image (450) amongst the totality (452) of pixels of the second image (450), each first pixel within the set of first pixels being visually related to a respective second pixel within the set of second pixels;
determining (1406), by the server (112), a first mapping information between the first image (400) and the second image (450);
generating (1408), by the server (112), a reference image (480) based on the first image (400) and the second image (450), the reference image (480) comprising a set (482) of synthetic pixels, the generating the reference image (480) comprises:

determining, by the server (112), a second mapping information between the first image (400) and the reference image (480); and computing, by the server (112), each synthetic pixel within the set (482) of synthetic pixels based on a respective first pixel within the set of first pixels correlated to a respective synthetic pixel within the set (482) of synthetic pixels and a respective second pixel within the set of second pixels correlated to the respective synthetic pixel within the set (482) of synthetic pixels, the computing each synthetic pixel comprises correlating, by the server (112), the respective first pixel to the respective synthetic pixel via the second mapping information and the respective second pixel to the respective synthetic pixel via the first and the second mapping information;

computing (1410), by the server (112), a first parameter and a second parameter, the first parameter being at least partially indicative of a visual dissimilarity between the first pixels and the respective synthetic pixels, the second parameter being at least partially indicative of the visual dissimilarity between the second pixels and the respective synthetic pixels; and storing (1412), by the server (112), in a storage (114) accessible by the server (112) the reference image (480), the first parameter, the second parameter, the first mapping information and the second mapping information.

CLAUSE 2. The method (1400) of clause 1, wherein the determining (1406) the first mapping information comprises:

selecting, by the server (112), at least two first pixels (304) within the first image (300);

identifying, by the server (112), positions of the at least two first pixels (304) within the first image (300) and positions of respective visually related second pixels (354) within the second image (350); and computing, by the server (112), a first set of transposition factors based on the positions of the at least two first pixels (304) within the first image (300) and the positions of the respective visually related second pixels (354) within the second image (350), the first set of transposition factors being indicative of the first mapping information between the first image (300) and the second image (350).

CLAUSE 3. The method (1400) of clause 1, wherein the generating (1408) the reference image (480) further comprises:

assessing, by the server (112), a resolution of the first image (400);

selecting, by the server (112), a resolution of the reference image (480); and computing, by the server (112), a second set of transposition factors being indicative of the second mapping information between the first image (400) and the reference image (480) based on the resolution of the reference image (480) and the resolution of the first image (400).

CLAUSE 4. The method (1400) of clause 1, the method (1400) further comprises:

identifying, by the server (112), a set (504) of third pixels amongst the totality (506) of pixels of the first image (500), each third pixel within the set (504) of third pixels being visually unrelated to any pixel within the totality (552) of pixels of the second image (550);

and wherein the reference image (580) further comprises a set (584) of first native pixels, the generating (1408) the reference image (580) further comprises computing, by the server (112), each first native pixel within the set (584) of first native pixels based on a respective third pixel within the set (504) of third pixels correlated to a respective first native pixel; and wherein the first parameter is further at least partially indicative of:

the visual dissimilarity between the third pixels and the respective first native pixels.

CLAUSE 5. The method (1400) of clause 4, wherein the computing each first native pixel comprises correlating, by the server (112), the respective third pixel to the respective first native pixel via the second mapping information.

CLAUSE 6. The method (1400) of clause 1, the method (1400) further comprises:

identifying, by the server (112), a set (654) of fourth pixels amongst the totality (656) of pixels of the second image (650), each fourth pixel within the set (654) of fourth pixels being visually unrelated to any pixel within the totality (602) of pixels of the first image (600);

and wherein the reference image (680) further comprises a set (684) of second native pixels, the generating (1408) the reference image (680) further comprises computing, by the server (112), each second native pixel within the set (684) of second native pixels based on a respective fourth pixel within the set (654) of fourth pixels correlated to a respective second native pixel; and wherein the second parameter is further at least partially indicative of:

the visual dissimilarity between the fourth pixels and the respective second native pixels.

CLAUSE 7. The method (1400) of clause 6, wherein the computing each second native pixel comprises correlating, by the server (112), the respective fourth pixel to the respective second native pixel via the first and the second mapping information.

CLAUSE 8. The method (1400) of clause 1, wherein the computing each synthetic pixel within the set (782) of synthetic pixels further comprises computing, by the server (112), a distinctive synthetic pixel (784) based on a distinctive pixel (704) within the totality (702) of pixels of the first image (700) correlated to the distinctive synthetic pixel (784) and an interpolated pixel (754) correlated to the distinctive synthetic pixel (784), the computing the distinctive synthetic pixel (784) comprises computing, by the server (112), the interpolated pixel (754) based on an amalgamation (758) of pixels within the totality (752) of pixels of the second image (750); and wherein the first parameter is further at least partially indicative of:

the visual dissimilarity between the distinctive pixel (704) within totality (702) of pixels of the first image (700) and the respective distinctive synthetic pixel (784) within the reference image (780).

CLAUSE 9. The method (1400) of clause 8, wherein the computing the distinctive synthetic pixel (884) is based on the distinctive pixel (854) within the totality (852) of pixels of the second image (850) correlated to the distinctive synthetic pixel (884) and the interpolated pixel (804) correlated to the distinctive synthetic pixel (884), the computing the distinctive synthetic pixel (884) comprises computing, by the server (112), the interpolated pixel (804) based on the amalgamation (808) of pixels within the totality (802) of pixels of the first image (800); and wherein the second parameter is further at least partially indicative of:
the visual dissimilarity between the distinctive pixel (854) within totality (852) of pixels of the second image (850) and the respective distinctive synthetic pixel (884) within the reference image (880).

CLAUSE 10. The method (1400) of clause 8, wherein the computing the distinctive synthetic pixel (784) further comprises correlating, by the server (112), the distinctive pixel (704) within the totality (702) of pixels of the first image (700) to the distinctive synthetic pixel (784) via the second mapping information and correlating the interpolated pixel (754) to the distinctive synthetic pixel (784) via the first and the second mapping information.

CLAUSE 11. The method (1400) of clause 9, wherein the computing the distinctive synthetic pixel (884) further comprises correlating, by the server (112), the distinctive pixel (854) within the totality (852) of pixels of the second image (850) to the distinctive synthetic pixel (884) via the first and the second mapping information and correlating the interpolated pixel (804) to the distinctive synthetic pixel (884) via the second mapping information.

CLAUSE 12. The method (1400) of clause 8, wherein the computing the interpolated pixel (754) comprises determining, by the server (112), the amalgamation (758) of pixels within the totality (752) of pixels of the second image (750) based on the first and the second mapping information.

CLAUSE 13. The method (1400) of clause 9, wherein the computing the interpolated pixel (804) comprises determining, by the server (112), the amalgamation (808) of pixels within the totality (802) of pixels of the first image (800) based on the second mapping information.

CLAUSE 14. The method (1400) of clause 1, wherein the computing each synthetic pixel within the set (482) of synthetic pixels further comprises averaging, by the server (112), the first pixel correlated to the respective synthetic pixel and the second pixel correlated to the respective synthetic pixel.

CLAUSE 15. The method (1400) of clause 8, wherein the computing the distinctive synthetic pixel (784) further comprises averaging, by the server (112), the distinctive pixel (704) within the totality (702) of pixels of the first image (700) correlated to the distinctive synthetic pixel (784) and the interpolated pixel (754) correlated to the distinctive synthetic pixel (784).

CLAUSE 16. The method (1400) of clause 9, wherein the computing the distinctive synthetic pixel (884) further comprises averaging, by the server (112), the distinctive pixel (854) within the totality (852) of pixels of the second image (850) correlated to the distinctive synthetic pixel (884) and the interpolated pixel (804) correlated to the distinctive synthetic pixel (884).

CLAUSE 17. The method (1400) of clause 1, wherein the first and the second parameter comprise a set (900) of first delta-pixels and a set (950) of second delta-pixels respectively and a resolution of the first (400) and the second (450) image respectively, the first delta-pixels within the set (900) of first delta-pixels being indicative of the visual dissimilarity between the first pixels and the respective synthetic pixels, the second delta-pixels within the set (950) of second delta-pixels being indicative of the visual dissimilarity between the second pixels and the respective synthetic pixels.

CLAUSE 18. The method (1400) of clause 17, wherein the first parameter further comprises the second mapping information and the second parameter further comprises the first and the second mapping information.

CLAUSE 19. A method (1500) of generating a first image (400), the first image (400) comprising a set of first pixels, the method (1500) being executed by a server (112), the method (1500) comprises:
Retrieving (1502), by the server (112), from a storage (114) accessible by the server (112):
i. a second mapping information;
ii. a reference image (480) comprising a set (482) of synthetic pixels, each synthetic pixel within the set (482) of synthetic pixels being correlated via a second mapping information to a respective first pixel within the set of first pixels within the first image (400); and
iii. a first parameter, the first parameter being at least partially indicative of a visual dissimilarity between first pixels within the set of first pixels and the respective synthetic pixels; and
Generating (1504), by the server (112), the first image (400) based on the first parameter, the second mapping information and the reference image (480).

CLAUSE 20. The method (1500) of clause 19, wherein each synthetic pixel within the set (482) of synthetic pixels is further correlated via a first mapping information and the second mapping information to a respective second pixel within a set of second pixels within a second image (450);
and wherein the retrieving (1504) further comprises retrieving, by the server (112):
i. a first mapping information; and
ii. a second parameter, the second parameter being at least partially indicative of the visual dissimilarity between second pixels within the set of second pixels and the respective synthetic pixels;
and wherein the method (1500) further comprises:
generating, by the server (112), the second image (450) based on the second parameter, the second mapping information, the first mapping information and the reference image (480).

CLAUSE 21. The method (1500) of clause 19, wherein the first image (500) further comprises a set (504) of third pixels;
and wherein the reference image (580) further comprises a set (584) of first native pixels, each first native pixel within the set (584) of first native pixels being correlated via the second mapping information to a respective third pixel within the set (504) of third pixels;
and wherein the first parameter is further at least partially indicative of the visual dissimilarity between the third pixels and the respective first native pixels.

CLAUSE 22. The method (1500) of clause 20, wherein the second image (650) further comprises a set (654) of fourth pixels;
and wherein the reference image (680) further comprises a set (684) of second native pixels, each second native pixel within the set (684) of second native pixels being correlated via the first and the second mapping information to a respective fourth pixel within the set (654) of fourth pixels;
and wherein the second parameter is further at least partially indicative of the visual dissimilarity between the fourth pixels and the respective second native pixels.

CLAUSE 23. The method (1500) of clause 19, wherein the first image (700) further comprises a distinctive pixel (704);
and wherein the set (782) of synthetic pixels further comprises a distinctive synthetic pixel (784) correlated via the second mapping information to the distinctive pixel (704) within the first image (700);
and wherein the first parameter is further at least partially indicative of the visual dissimilarity between the distinctive pixel (704) within the first image (700) and the distinctive synthetic pixel (784).

CLAUSE 24. The method (1500) of clause 23, wherein the second image (850) further comprises the distinctive pixel (854);
and wherein the set (882) of synthetic pixels further comprises the distinctive synthetic pixel (884) correlated via the first and the second mapping information to the distinctive pixel (854) within the second image (850);
and wherein the second parameter is further at least partially indicative of the visual dissimilarity between the distinctive pixel (854) within the second image (850) and the distinctive synthetic pixel (884).

CLAUSE 25. The method (1500) of clause 20, wherein the method (1500) further comprises sending, by the server (112), instructions to an electronic device (104) for displaying the first (400) and the second (450) image to a user (102).

CLAUSE 26. A server (112) comprising a processor and a storage (114), the storage (114) storing computer-readable instructions, the server (112) being configured to execute a method (1400) within clauses 1 to 18.

CLAUSE 27. A server (112) comprising a processor and a storage (114), the storage (114) storing computer-readable instructions, the server (112) being configured to execute a method (1500) within clauses 19 to 25.

What is claimed is:

1. A method of processing and storing a group of images, the method being executed by a server, the method comprising:
   acquiring, by the server, a first image and a second image, the first image comprising a totality of pixels of the first image and the second image comprising a totality of pixels of the second image;
   determining, by the server, that the first image and the second image are visually related, thus generating the group of images, the group of images including the first image and the second image, the determining that the first image and the second image are visually related comprises identifying, by the server, a set of first pixels within the first image amongst the totality of pixels of the first image and a set of second pixels within the second image amongst the totality of pixels of the second image, each first pixel within the set of first pixels being visually related to a respective second pixel within the set of second pixels;
   determining, by the server, a first mapping information between the first image and the second image;
   generating, by the server, a reference image based on the first image and the second image, the reference image comprising a set of synthetic pixels, the generating the reference image comprises:
      determining, by the server, a second mapping information between the first image and the reference image; and
      computing, by the server, each synthetic pixel within the set of synthetic pixels based on a respective first pixel within the set of first pixels correlated to a respective synthetic pixel within the set of synthetic pixels and a respective second pixel within the set of second pixels correlated to the respective synthetic pixel within the set of synthetic pixels, the computing each synthetic pixel comprises correlating, by the server, the respective first pixel to the respective synthetic pixel via the second mapping information and the respective second pixel to the respective synthetic pixel via the first and the second mapping information;
   computing, by the server, a first parameter and a second parameter, the first parameter being at least partially indicative of a visual dissimilarity between the first pixels and the respective synthetic pixels, the second parameter being at least partially indicative of the visual dissimilarity between the second pixels and the respective synthetic pixels; and
   storing, by the server, in a storage accessible by the server, the group of images as: the reference image, the first parameter, the second parameter, the first mapping information and the second mapping information.

2. The method of claim 1, wherein the determining the first mapping information comprises:
   selecting, by the server, at least two first pixels within the first image;
   identifying, by the server, positions of the at least two first pixels within the first image and positions of respective visually related second pixels within the second image; and
   computing, by the server, a first set of transposition factors based on the positions of the at least two first pixels within the first image and the positions of the respective visually related second pixels within the second image, the first set of transposition factors being indicative of the first mapping information between the first image and the second image.

3. The method of claim 1, wherein the generating the reference image further comprises:
   assessing, by the server, a resolution of the first image;
   selecting, by the server, a resolution of the reference image; and
   computing, by the server, a second set of transposition factors being indicative of the second mapping information between the first image and the reference image based on the resolution of the reference image and the resolution of the first image.

4. The method of claim 1, the method further comprises:
   identifying, by the server, a set of third pixels amongst the totality of pixels of the first image, each third pixel within the set of third pixels being visually unrelated to any pixel within the totality of pixels of the second image;
and wherein the reference image further comprises a set of first native pixels, the generating the reference image further comprises computing, by the server, each first native pixel within the set of first native pixels based on a respective third pixel within the set of third pixels correlated to a respective first native pixel; and wherein the first parameter is further at least partially indicative of:
   the visual dissimilarity between the third pixels and the respective first native pixels.

5. The method of claim 4, wherein the computing each first native pixel comprises correlating, by the server, the respective third pixel to the respective first native pixel via the second mapping information.

6. The method of claim 1, the method further comprises:
identifying, by the server, a set of fourth pixels amongst the totality of pixels of the second image, each fourth pixel within the set of fourth pixels being visually unrelated to any pixel within the totality of pixels of the first image;
and wherein the reference image further comprises a set of second native pixels, the generating the reference image further comprises computing, by the server, each second native pixel within the set of second native pixels based on a respective fourth pixel within the set of fourth pixels correlated to a respective second native pixel; and wherein the second parameter is further at least partially indicative of:
the visual dissimilarity between the fourth pixels and the respective second native pixels.

7. The method of claim 6, wherein the computing each second native pixel comprises correlating, by the server, the respective fourth pixel to the respective second native pixel via the first and the second mapping information.

8. The method of claim 1, wherein the computing each synthetic pixel within the set of synthetic pixels further comprises computing, by the server, a distinctive synthetic pixel based on a distinctive pixel within the totality of pixels of the first image correlated to the distinctive synthetic pixel and an interpolated pixel correlated to the distinctive synthetic pixel, the computing the distinctive synthetic pixel comprises computing, by the server, the interpolated pixel based on an amalgamation of pixels within the totality of pixels of the second image; and wherein the first parameter is further at least partially indicative of:
the visual dissimilarity between the distinctive pixel within totality of pixels of the first image and the respective distinctive synthetic pixel within the reference image.

9. The method of claim 8, wherein the computing the distinctive synthetic pixel is based on the distinctive pixel within the totality of pixels of the second image correlated to the distinctive synthetic pixel and the interpolated pixel correlated to the distinctive synthetic pixel, the computing the distinctive synthetic pixel comprises computing, by the server, the interpolated pixel based on the amalgamation of pixels within the totality of pixels of the first image; and wherein the second parameter is further at least partially indicative of:
the visual dissimilarity between the distinctive pixel within totality of pixels of the second image and the respective distinctive synthetic pixel within the reference image.

10. The method of claim 9, wherein the computing the distinctive synthetic pixel further comprises correlating, by the server, the distinctive pixel within the totality of pixels of the second image to the distinctive synthetic pixel via the first and the second mapping information and correlating the interpolated pixel to the distinctive synthetic pixel via the second mapping information.

11. The method of claim 9, wherein the computing the interpolated pixel comprises determining, by the server, the amalgamation of pixels within the totality of pixels of the first image based on the second mapping information.

12. The method of claim 9, wherein the computing the distinctive synthetic pixel further comprises averaging, by the server, the distinctive pixel within the totality of pixels of the second image correlated to the distinctive synthetic pixel and the interpolated pixel correlated to the distinctive synthetic pixel.

13. The method of claim 8, wherein the computing the distinctive synthetic pixel further comprises correlating, by the server, the distinctive pixel within the totality of pixels of the first image to the distinctive synthetic pixel via the second mapping information and correlating the interpolated pixel to the distinctive synthetic pixel via the first and the second mapping information.

14. The method of claim 8, wherein the computing the interpolated pixel comprises determining, by the server, the amalgamation of pixels within the totality of pixels of the second image based on the first and the second mapping information.

15. The method of claim 8, wherein the computing the distinctive synthetic pixel further comprises averaging, by the server, the distinctive pixel within the totality of pixels of the first image correlated to the distinctive synthetic pixel and the interpolated pixel correlated to the distinctive synthetic pixel.

16. The method of claim 1, wherein the computing each synthetic pixel within the set of synthetic pixels further comprises averaging, by the server, the first pixel correlated to the respective synthetic pixel and the second pixel correlated to the respective synthetic pixel.

17. The method of claim 1, wherein the first and the second parameter comprise a set of first delta-pixels and a set of second delta-pixels respectively and a resolution of the first and the second image respectively, the first delta-pixels within the set of first delta-pixels being indicative of the visual dissimilarity between the first pixels and the respective synthetic pixels, the second delta-pixels within the set of second delta-pixels being indicative of the visual dissimilarity between the second pixels and the respective synthetic pixels.

18. The method of claim 17, wherein the first parameter further comprises the second mapping information and the second parameter further comprises the first and the second mapping information.

19. A method of generating a group of visually related images including a first image and a second image, the group of images having been stored in a storage accessible by the server as a first mapping information, a second mapping information, a first parameter, a second parameter, and a reference image, the first image comprising a set of first pixels, the second image comprising a set of second pixels, the method being executed by a server, the method comprises:
retrieving, by the server, from the storage accessible by the server:
  i. the first mapping information between the first image and the second image;
  ii. the second mapping information;
  iii. the reference image, the reference image comprising a set of synthetic pixels, each synthetic pixel within the set of synthetic pixels being correlated via a second mapping information to a respective first pixel within the set of first pixels within the first image and correlated via the second mapping information and the first mapping information to a respective second pixel within the set of second pixels within the second image; and
  iv. the first parameter, the first parameter being at least partially indicative of a visual dissimilarity between first pixels within the set of first pixels and the respective synthetic pixels;
  v. the second parameter, the second parameter being at least partially indicative of a visual dissimilarity between the second pixels within the set of second pixels and respective synthetic pixels of the set of synthetic pixels; and generating, by the server, the group of visually related images based on the first parameter, the second parameter, the first mapping information, the second mapping information and the reference image.

\* \* \* \* \*